United States Patent
LaPray et al.

(10) Patent No.: US 11,674,014 B2
(45) Date of Patent: Jun. 13, 2023

(54) BLENDING OF SMALL PARTICLE STARCH POWDER WITH SYNTHETIC POLYMERS FOR INCREASED STRENGTH AND OTHER PROPERTIES

(71) Applicant: BiologiQ, Inc., Idaho Falls, ID (US)

(72) Inventors: Bradford LaPray, Idaho Falls, ID (US); Donald R. Allen, Idaho Falls, ID (US); Wenji Quan, Idaho Falls, ID (US); Bruno R. Pereira, Houston, TX (US); Shigenobu Miura, Tokyo (JP)

(73) Assignee: BIOLOGIQ, INC., Idaho Falls, ID (US)

( * ) Notice: Subject to any disclaimer, the term of this patent is extended or adjusted under 35 U.S.C. 154(b) by 0 days.

(21) Appl. No.: 16/925,747

(22) Filed: Jul. 10, 2020

(65) Prior Publication Data

US 2020/0339781 A1 Oct. 29, 2020

Related U.S. Application Data

(63) Continuation-in-part of application No. 15/691,588, filed on Aug. 30, 2017, now Pat. No. 11,046,840, (Continued)

(51) Int. Cl.
  *C08K 5/1545* (2006.01)
(52) U.S. Cl.
  CPC .................. *C08K 5/1545* (2013.01)
(58) Field of Classification Search
  CPC ........... C08L 3/02; C05G 5/35; C08K 5/0016; C09D 103/02
  See application file for complete search history.

(56) References Cited

U.S. PATENT DOCUMENTS

| 3,270,874 A | 9/1966 | Hilton |
| 3,865,603 A | 2/1975 | Szymanski et al. |

(Continued)

FOREIGN PATENT DOCUMENTS

| BR | PI0715273 A2 | 6/2013 |
| BR | PI0715276 A2 | 6/2013 |

(Continued)

OTHER PUBLICATIONS

Ibbrucker, Constance "Oxo-degradable plastics increasingly under fire in Europe" European Bioplastics, http://www.european-bioplastics.org/oxo-degradable-plastics-increasingly-under-fire-in-europe/ Feb. 28, 2017, 5 pages.

(Continued)

*Primary Examiner* — Arrie L Reuther
(74) *Attorney, Agent, or Firm* — Workman Nydegger

(57) ABSTRACT

Described herein are blends of starch or starch-based materials with polymeric materials, where the starch or starch-based material is intimately blended with the polymeric material, so as to exhibit very small particles sizes (e.g., less than 2 μm, or less than 1 μm) for the starch or starch-based material in the matrix of the polymeric material. Such intimate dispersion of very small particles provides for far more of the particles dispersed more evenly throughout the matrix of the polymeric material, which may enhance various performance characteristics of the blended composite material. Methods of producing articles from such blends exhibiting such small particles and excellent dispersion are also disclosed.

35 Claims, 3 Drawing Sheets

Related U.S. Application Data which is a continuation-in-part of application No. 15/481,823, filed on Apr. 7, 2017, now Pat. No. 10,919,203, and a continuation-in-part of application No. 15/481,806, filed on Apr. 7, 2017, now Pat. No. 10,995,201, and a continuation-in-part of application No. 14/853,725, filed on Sep. 14, 2015, now abandoned, and a continuation-in-part of application No. 14/853,780, filed on Sep. 14, 2015, now abandoned.

(60) Provisional application No. 62/962,706, filed on Jan. 17, 2020, provisional application No. 62/939,460, filed on Nov. 22, 2019, provisional application No. 62/872,582, filed on Jul. 10, 2019, provisional application No. 62/442,432, filed on Jan. 4, 2017, provisional application No. 62/440,399, filed on Dec. 29, 2016, provisional application No. 62/187,231, filed on Jun. 30, 2015.

(56) References Cited

U.S. PATENT DOCUMENTS

| | | | |
|---|---|---|---|
| 4,016,117 A | 4/1977 | Griffin | |
| 4,139,699 A | 2/1979 | Hernandez | |
| 4,243,480 A | 1/1981 | Hernandez | |
| 4,853,168 A | 8/1989 | Eden et al. | |
| 5,026,745 A | 6/1991 | Weil | |
| 5,095,054 A | 3/1992 | Lay et al. | |
| 5,262,458 A * | 11/1993 | Bastioli | C08L 3/02 524/52 |
| 5,314,934 A | 5/1994 | Tomka | |
| 5,362,777 A | 11/1994 | Tomka | |
| 5,449,708 A | 9/1995 | Schiltz | |
| 5,459,258 A | 10/1995 | Merrill et al. | |
| 5,461,093 A | 10/1995 | Yoo et al. | |
| 5,462,983 A | 10/1995 | Bloembergen et al. | |
| 5,510,401 A | 4/1996 | Dehennau et al. | |
| 5,714,445 A | 2/1998 | Trinh et al. | |
| 5,810,961 A | 9/1998 | Andersen et al. | |
| 6,211,325 B1 | 4/2001 | Sun et al. | |
| 6,472,497 B2 | 10/2002 | Loercks et al. | |
| 6,605,657 B1 | 8/2003 | Favis et al. | |
| 6,709,526 B1 | 3/2004 | Bailey et al. | |
| 6,783,854 B2 | 8/2004 | Bond | |
| 6,818,295 B2 | 11/2004 | Bond et al. | |
| 6,841,597 B2 | 1/2005 | Bastioli et al. | |
| 6,844,380 B2 | 1/2005 | Favis et al. | |
| 6,946,506 B2 | 9/2005 | Bond et al. | |
| 7,608,649 B2 | 10/2009 | Sun et al. | |
| 7,666,261 B2 | 2/2010 | Bailey et al. | |
| 7,740,952 B2 | 6/2010 | Hausmann et al. | |
| 7,998,888 B2 | 8/2011 | Shi et al. | |
| 8,188,185 B2 | 5/2012 | Wang et al. | |
| 8,232,348 B2 | 7/2012 | Changping | |
| 8,283,006 B2 | 10/2012 | Wang et al. | |
| 8,329,501 B1 | 12/2012 | Robinson et al. | |
| 8,329,601 B2 | 12/2012 | Shi et al. | |
| 8,466,337 B2 | 6/2013 | Wang et al. | |
| 8,470,222 B2 | 6/2013 | Shi et al. | |
| 8,802,754 B2 | 8/2014 | Nie et al. | |
| 8,807,254 B2 | 8/2014 | Manus | |
| 8,889,945 B2 | 11/2014 | Wang et al. | |
| 8,927,611 B2 | 1/2015 | Voolapalli et al. | |
| 8,927,617 B2 | 1/2015 | Funk et al. | |
| 8,969,224 B2 | 3/2015 | Masuda et al. | |
| 9,023,918 B1 | 5/2015 | Mistry et al. | |
| 9,056,968 B2 | 6/2015 | Matsuo | |
| 9,273,207 B2 | 3/2016 | Bastioli | |
| 9,327,438 B2 | 5/2016 | Wang et al. | |
| 9,464,188 B2 | 10/2016 | Wang et al. | |
| 9,884,471 B2 | 2/2018 | Neuman et al. | |
| 9,925,706 B2 | 3/2018 | Bond et al. | |
| 10,131,783 B2 | 11/2018 | Schmidt et al. | |
| 10,214,634 B2 | 2/2019 | Lapray et al. | |
| 10,239,292 B2 | 3/2019 | Nissenbaum et al. | |
| 10,494,521 B2 | 12/2019 | Lu et al. | |
| 10,752,759 B2 | 8/2020 | Lapray et al. | |
| 10,906,209 B2 | 2/2021 | Kann | |
| 10,919,203 B2 | 2/2021 | Lapray et al. | |
| 10,920,044 B2 | 2/2021 | Lapray et al. | |
| 11,111,355 B2 | 9/2021 | Lapray et al. | |
| 11,111,363 B2 | 9/2021 | Lapray et al. | |
| 11,149,144 B2 | 10/2021 | Lapray et al. | |
| 11,359,088 B2 | 6/2022 | Allen et al. | |
| 2002/0006989 A1 | 1/2002 | Bastioli et al. | |
| 2002/0168517 A1 | 11/2002 | Husemann et al. | |
| 2002/0168518 A1 | 11/2002 | Bond et al. | |
| 2002/0188041 A1 | 12/2002 | Bond et al. | |
| 2003/0077444 A1 | 4/2003 | Bond et al. | |
| 2003/0119949 A1 | 6/2003 | Favis et al. | |
| 2003/0166779 A1 | 9/2003 | Khemani | |
| 2003/0203196 A1 | 10/2003 | Trokhan et al. | |
| 2007/0129468 A1 | 6/2007 | Bastioli et al. | |
| 2008/0103232 A1 | 5/2008 | Lake et al. | |
| 2008/0287592 A1 | 11/2008 | Favis et al. | |
| 2009/0042468 A1 | 2/2009 | Suzuki et al. | |
| 2009/0048368 A1 | 2/2009 | Bash et al. | |
| 2010/0115836 A1 | 5/2010 | Julian | |
| 2010/0159777 A1 | 6/2010 | Wang et al. | |
| 2010/0311874 A1 | 12/2010 | Mentink et al. | |
| 2010/0311905 A1 | 12/2010 | Mentink et al. | |
| 2011/0287929 A1 | 11/2011 | Smith et al. | |
| 2012/0048769 A1 | 3/2012 | Sivik et al. | |
| 2012/0059097 A1 | 3/2012 | Liao et al. | |
| 2012/0139154 A1 | 6/2012 | Huneault et al. | |
| 2012/0220697 A2 | 8/2012 | Deaner et al. | |
| 2012/0283364 A1 | 11/2012 | Sarazin et al. | |
| 2012/0316257 A1 | 12/2012 | Bastioli | |
| 2013/0001289 A1 | 1/2013 | Tedford | |
| 2013/0052901 A1 | 2/2013 | Bond et al. | |
| 2013/0157031 A1 | 6/2013 | Wang et al. | |
| 2013/0157032 A1 | 6/2013 | Wang et al. | |
| 2014/0011921 A1 | 1/2014 | Bash et al. | |
| 2014/0079935 A1 | 3/2014 | Broyles | |
| 2014/0087980 A1 | 3/2014 | Mitrovich et al. | |
| 2014/0272370 A1 | 9/2014 | Broyles et al. | |
| 2015/0045454 A1 | 2/2015 | Kong et al. | |
| 2015/0166746 A1 | 6/2015 | Brule et al. | |
| 2016/0107426 A1 | 4/2016 | Leufgens | |
| 2017/0002184 A1 | 1/2017 | Lapray et al. | |
| 2017/0002185 A1 | 1/2017 | Lapray et al. | |
| 2017/0210889 A1 | 7/2017 | Lapray et al. | |
| 2017/0218184 A1 | 8/2017 | Lapray et al. | |
| 2017/0283597 A1 | 10/2017 | Lapray et al. | |
| 2017/0355179 A1 | 12/2017 | Sehanobish et al. | |
| 2017/0362418 A1 | 12/2017 | Lapray et al. | |
| 2018/0100060 A1 | 4/2018 | Lapray et al. | |
| 2019/0194426 A1 | 6/2019 | Lapray et al. | |
| 2019/0256681 A1 | 8/2019 | Lapray et al. | |
| 2019/0276664 A1 | 9/2019 | Lapray et al. | |
| 2019/0315942 A1 | 10/2019 | Lapray et al. | |
| 2019/0315947 A1 | 10/2019 | Lapray et al. | |
| 2019/0330770 A1 | 10/2019 | Shi et al. | |
| 2020/0339784 A1 | 10/2020 | Lapray et al. | |
| 2020/0339803 A1 | 10/2020 | Allen et al. | |
| 2020/0377705 A1 | 12/2020 | LaPray et al. | |
| 2021/0269944 A1 | 9/2021 | Allen et al. | |
| 2021/0277207 A1 | 9/2021 | Allen et al. | |
| 2021/0277556 A1 | 9/2021 | Allen et al. | |
| 2021/0324186 A1 | 10/2021 | LaPray et al. | |
| 2021/0363335 A1 | 11/2021 | LaPray et al. | |
| 2022/0227949 A1 | 7/2022 | Allen et al. | |

FOREIGN PATENT DOCUMENTS

| | | |
|---|---|---|
| BR | PI0817531 B1 | 8/2019 |
| BR | 112013002928 B1 | 6/2020 |
| BR | 112020012930 A2 | 12/2020 |
| BR | 102020022378 A2 | 5/2022 |
| CA | 1031088 A | 5/1978 |
| CA | 2827702 A1 | 3/2014 |
| CN | 1312838 A | 9/2001 |
| CN | 1603361 A | 4/2005 |

(56) References Cited

FOREIGN PATENT DOCUMENTS

| | | |
|---|---|---|
| CN | 101171292 A | 4/2008 |
| CN | 101589097 A | 11/2009 |
| CN | 101805499 A | 8/2010 |
| CN | 101932647 A | 12/2010 |
| CN | 102066467 A | 5/2011 |
| CN | 102153786 A | 8/2011 |
| CN | 102329436 A | 1/2012 |
| CN | 102639594 A | 8/2012 |
| CN | 102850626 A | 1/2013 |
| CN | 103087482 A | 5/2013 |
| CN | 103289165 A | 9/2013 |
| CN | 103627153 A | 3/2014 |
| CN | 103819794 A | 5/2014 |
| CN | 103987504 A | 8/2014 |
| CN | 103998195 A | 8/2014 |
| CN | 105531115 A | 4/2016 |
| CN | 105670239 A | 6/2016 |
| CN | 105966014 A | 9/2016 |
| CN | 107793619 A | 3/2018 |
| CN | 108276744 A | 7/2018 |
| EP | 0326517 A1 | 8/1989 |
| EP | 0497706 A1 | 8/1992 |
| EP | 1930487 A1 | 6/2008 |
| EP | 2762307 A1 | 8/2014 |
| GB | 2272699 A | 5/1994 |
| JP | 49-055740 A | 5/1974 |
| JP | 50-086543 A | 7/1975 |
| JP | 04-202567 A | 7/1992 |
| JP | 07-126449 A | 5/1995 |
| JP | 07-258488 A | 10/1995 |
| JP | 09-041224 A | 2/1997 |
| JP | 10-259083 A | 9/1998 |
| JP | 11-322962 A | 11/1999 |
| JP | 2003-073539 A | 3/2003 |
| JP | 2003-518541 A | 6/2003 |
| JP | 2004-002613 A | 1/2004 |
| JP | 2004-202567 | 7/2004 |
| JP | 3539955 B2 | 7/2004 |
| JP | 2005-089718 A | 4/2005 |
| JP | 2005-264111 A | 9/2005 |
| JP | 2008-013602 A | 1/2008 |
| JP | 4202567 | 12/2008 |
| JP | 2009-185305 A | 8/2009 |
| JP | 2010-150305 A | 7/2010 |
| JP | 2010-260923 A | 11/2010 |
| JP | 2011-042032 A | 3/2011 |
| JP | 2011-511120 A | 4/2011 |
| JP | 2011-511121 A | 4/2011 |
| JP | 2011-213836 A | 10/2011 |
| JP | 2012-148507 A | 8/2012 |
| JP | 2013-509495 A | 3/2013 |
| JP | 2013-147609 A | 8/2013 |
| JP | 5544303 B2 | 7/2014 |
| JP | 2014-518956 A | 8/2014 |
| JP | 2018-502744 A | 2/2018 |
| JP | 2018-525467 A | 9/2018 |
| JP | 6949736 B2 | 10/2021 |
| TW | 201538529 A | 10/2015 |
| WO | 01/48078 A1 | 7/2001 |
| WO | 03/14164 A1 | 2/2003 |
| WO | 2006/116861 A1 | 11/2006 |
| WO | 2007/027163 A2 | 3/2007 |
| WO | 2009/073197 A1 | 6/2009 |
| WO | 2009/103052 A1 | 8/2009 |
| WO | 2011/020170 A1 | 2/2011 |
| WO | 2012/088585 A1 | 7/2012 |
| WO | 2013/116945 A1 | 8/2013 |
| WO | 2014/089321 A1 | 6/2014 |
| WO | 2014/190395 A1 | 12/2014 |
| WO | 2014/190935 A1 | 12/2014 |
| WO | 2015/028943 A1 | 3/2015 |
| WO | 2016/109196 A1 | 7/2016 |
| WO | 2016/134994 A1 | 9/2016 |
| WO | 2016/198652 A1 | 12/2016 |
| WO | 2018/125897 A1 | 7/2018 |
| WO | 2018/187784 A1 | 10/2018 |
| WO | 2019/043134 A1 | 3/2019 |
| WO | 2019/108056 A1 | 6/2019 |
| WO | 2020/106654 A1 | 5/2020 |

OTHER PUBLICATIONS

IDS Statement filed Aug. 21, 2020 in U.S. Appl. No. 16/999,542.
International Search Report issued in PCT Application PCT/US2019/28733, dated Mar. 9, 2019.
Jie Ren "Preparation, characterization and properties of binary and ternary blends with thermoplastic starch, poly(lactic acid) and poly(butylene adipate-co-terephthalate)," Elsevier, Carbohydrate Polymers, 2008, pp. 576-582.
Kalambur, et al. "An Overview of Starch-Based Plastic Blends From Reactive Extrusion" Journal of Plastic Film and Sheeting, 2006, vol. 22, pp. 39-58.
Li, Gang, et al., "Biodegradation of Thermoplastic Starch and its Blends with Poly(lactic acid) and Polyethylene: Influence of Morphology" published in Macromolecular Journals of Chemistry and Physics, 2011 pp. 1147-1154.
Luo, Ying, et al. "Accelerating the degradation of polyethylene composite mulches." Plastics Research Online, May 19, 2017. Society of Plastics Engineers (SPE), DOI: 10.2417/spepro.006909. Accessed Apr. 20, 2018.
Marianne Shirai "Thermoplastic starch/polyester films: Effects of extrusion process and poly (lactic acid) addition," Elsevier, Materials Science and Engineering, 2013, pp. 4112-4117.
Meereboer et al., "Review of recent advances in the biodegradability of polyhydroxyalkanoate (PHA) bioplastics and their composites," Green Chem., vol. 22, 2020, pp. 5519-5558.
Ming et al, CN107793619 Machine Translation, Mar. 13, 2018 (Year: 2018).
Nayak, "Biodegradable PBAT/Starch Nanocomposites", Nov. 24, 2010, Polymer-Plastics Technology and Engineering, 49:14, pp. 1406-1418, accessed on Feb. 24, 2013.
Nguyen et al., "Biodegradability of polymer film based on low density polyethylene and cassava starch," International Biodeterioration & Biodegradation, vol. 115, 2016, pp. 257-265.
Non-Final Office Action received for U.S. Appl. No. 15/691,588, dated Sep. 24, 2020, 10 pages.
Notice of Allowance received for U.S. Appl. No. 15/628,379, dated Oct. 3, 2018.
Notice of Allowance received for U.S. Appl. No. 16/456,303, dated Jul. 1, 2020.
Notice of Allowance received for U.S. Appl. No. 16/456,303, dated Jul. 28, 2020.
Office action for U.S. Appl. No. 14/853,725, dated Apr. 28, 2017, LaPray et al., "Articles Formed with Biodegradable Materials and Strength Characteristics of Same", 13 pages.
Office action for U.S. Appl. No. 14/853,725, dated Apr. 30, 2018, LaPray et al., "Articles Formed with Biodegradable Materials and Strength Characteristics of Same", 19 pages.
Office Action for U.S. Appl. No. 14/853,725, dated Oct. 12, 2018, LaPray et al, "Articles Formed with Biodegradable Materials and Strength Characteristics of Same", 13 pages.
Office Action received for U.S. Appl. No. 15/481,806, dated Apr. 30, 2018.
Office Action received for U.S. Appl. No. 15/481,823, dated Apr. 30, 2018.
Office Action received for U.S. Appl. No. 15/691,588, dated Apr. 30, 2018.
Office Action received for U.S. Appl. No. 15/836,555, dated Aug. 12, 2019.
Office Action received for U.S. Appl. No. 15/691,588, dated May 10, 2019.
Office Action received for U.S. Appl. No. 14/853,780, dated Aug. 10, 2018.
Office Action received for U.S. Appl. No. 14/853,780, dated Feb. 28, 2019.
Office Action received for U.S. Appl. No. 14/853,780, dated Nov. 6, 2017.

(56) References Cited

OTHER PUBLICATIONS

Office Action received for U.S. Appl. No. 14/853,780, dated Oct. 12, 2016.
Office Action received for U.S. Appl. No. 15/481,806, dated Feb. 28, 2019.
Office Action received for U.S. Appl. No. 15/481,806, dated Jul. 29, 2020.
Office Action received for U.S. Appl. No. 15/481,806, dated Oct. 12, 2018.
Office Action received for U.S. Appl. No. 15/481,823, dated Dec. 9, 2019.
Office Action received for U.S. Appl. No. 15/481,823, dated Feb. 28, 2019.
Office Action received for U.S. Appl. No. 15/628,379, dated Apr. 30, 2018.
Office Action received for U.S. Appl. No. 15/691,588, dated Jan. 2, 2019.
Office Action received for U.S. Appl. No. 15/836,555, dated Jul. 14, 2020.
Office Action received for U.S. Appl. No. 16/287,884, dated Jul. 30, 2020.
Office Action received for U.S. Appl. No. 16/391,909, dated Dec. 1, 2020.
Office Action received for U.S. Appl. No. 16/456,295, dated Jul. 22, 2020.
Office Action received for U.S. Appl. No. 16/456,303, dated Apr. 9, 2020.
Ohtake, et al., "The Biodegradability of Polyethylene", Material Life, vol. 6, Issue 3, 1994, pp. 125-133.
Ojeda, et al., "Degradability of linear polyolefins under natural weathering, Polymer Degradation and Stability," 2011, pp. 703-707.
Ojeda, Telmo, et al., "Polymer Degradation and Stability" Available as early as Dec. 16, 2010 at www.elsevier.com/locat/polydegstab, 5 pages.
Oluz, Zehra and Teoman Tincer, "Additives for ultraviolet-induced oxidative degradation of low-density polyethylene", J. Appl. Polym. Sci., 133, 43354, Jan. 18, 2016, Wiley Online Library, DOI: 10.1002/app.43354, Accessed Apr. 21, 2018.
PCT International Search Report and the Written Opinion for Application No. PCT/US/18/026610, dated Jul. 13, 2018, 10 pages.
PCT International Search Report and the Written Opinion for Application No. PCT/US17/68492, dated Mar. 16, 2018, 10 pages.
PCT Search Report and Written Opinion dated Sep. 14, 2016 for PCT Application No. PCT/US16/40092, 8 pages.
PCT Search Report and Written Opinion dated Sep. 15, 2016 for PCT Application No. PCT/US16/40104, 10 pages.
Pearce "Biodegradable plastic bags carry more ecological harm than good" The Guardian, Jun. 18, 2009.
Requirement for Restriction/Election received for U.S. Appl. No. 16/391,909, dated Sep. 8, 2020.
Ruchuan et al., "Study on Starch-Polyethylene Film", Journal of Tianjin University, No. 2, 1990, pp. 23-29.
S.K. Nayak "Biodegradable PBAT/Starach Nanocomposites" Polymer-Plastics Technology and Engineering, 2010, pp. 1406-1418.
Santos, R. A. L. et al,, "Starch/Poly (Butylene Adipate-Co-Terephthalate)/Montmorillonite Films Produced by Blow Extrusion". Quim. Nova 2014, 37(6), 937-942. (Year: 2014).
Sashiwa et al., "Microbial Degradation Behavior in Seawater of Polyester Blends Containing Poly(3-hydroxybutyrate-co-3-hydroxyhexanoate) (PHBHHx)," Mar. Drugs, vol. 16, 2018, 34, 11 pages.
Schwach et al., "Starch-based biodegradable blends: morphology and interface properties", 2004, Polymer International, vol. 53, pp. 2115-2124, DOI: 10.1002/pi.1636.
Shahin, "In-situ Nano Fibrillation of Polyethylene Terephthalate (PET) in Polypropylene (PP) through Spunbond Process," Department of Mechanical and Industrial Engineering, 2019, 89 pages.
Shang, Jing, et al. "Photocatalytic Degradation of Polystyrene Plastic under Fluorescent Light." Environmental Science & Technology, Sep. 5, 2003, 37 (19), pp. 4494-4499. American Chemical Society, DOI: 10.1021/es0209464. Accessed Apr. 20, 2018.
Shogren et al. "Biodegradation of starch/polylactic acid/poly(hydroxyester-ether) composite bars in soil" Polymer Degradation and Stability 79 (2003) 405-411.
Sumathi, Tirupati et al, "Production of Laccase by *Cochliobolus* sp. Isolated from Plastic Dumped Soils and Their Ability to Degrade Low Molecular Weight PVC", Biochemistry Research International 2016 (2016): 9519527. PMC. Web. Apr. 16, 2018.
Tang, et al., "Recent Advances in Starch, Polyvinyl Alcohol Based Polymer Blends, Nanocomposites and their Biodegradability" Carbohydrate Polymers, 2011, vol. 85, pp. 7-16.
Tena-Salcido et al. "Effect of Morphology on the Biodegradation of Thermoplastic Starch in LDPE/TPS Blends" Polymer Bulletin, vol. 60, No. 5, Jan. 30, 2008, pp. 677-688.
Thakore, I.M., et al., "Studies on Biodegradability, morphology and thermo-mechanical properties of LDPE/modified starch blends" published in The European Polymer Journal, vol. 37 2001, pp. 151-160.
The SPC Position Against Biodegradability Additives for Petroleum-Based Plastics Sustainable Packaging Coalition, http://www.sustainablepackaging.org/content/?type=5&id=position-against-biodegradability-additives-for-petroleum-based-plastics Retreived on Sep. 19, 2017, 5 pages.
Thryft, Ann R, "Biodegradable Plastics Standard to Bust Landfill Waste", ENSO Plastics, Nov. 15, 2011. http://ensoplastics.com/theblog/?p=535, Accessed Apr. 23, 2018.
Tokiwa, et al., "Biodegradability of Plastics" in the International Journal of Molecular Sciences, Aug. 26, 2009, vol. 10, pp. 3722-3742.
Transition Metal Salts, Oxo-biodegradable Plastics Association, http://www.biodeg.org/index.html. Accessed Apr. 20, 2018.
Turley "Coca-Cola Collaborates on Bio-PET Project" ChemistryWorld, Jun. 11, 2012, accessed Apr. 6, 2017 at https://www.chemistryworld.com/news/coca-cola-collaborates-on-bio-pet-project/5091.article, 2 pages.
U.S. Appl. No. 15/481,823, filed Apr. 7, 2017, LaPray.
U.S. Application filed Apr. 7, 2017, by LaPray, U.S. Appl. No. 15/481,806.
U.S. Application filed Apr. 23, 2019, by LaPray, U.S. Appl. No. 16/391,909.
U.S. Application filed Aug. 21, 2020, by LaPray, U.S. Appl. No. 16/999,542.
U.S. Application filed Aug. 30, 2017, by LaPray., U.S. Appl. No. 15/691,588.
U.S. Application filed Feb. 27, 2019, by LaPray, U.S. Appl. No. 16/287,884.
U.S. Application filed Jun. 20, 2017, by LaPray, U.S. Appl. No. 15/628,379.
U.S. Patent Application filed Jul. 10, 2020 by LaPray, U.S. Appl. No. 16/925,705.
U.S. Patent Application filed Jul. 10, 2020 by LaPray, U.S. Appl. No. 16/925,952.
Van Soest et al. "Crystallinity in Starch Plastics: Consequences for Material Properties" Trends in Biotechnology, vol. 15, No. 6, Jun. 1, 1997, pp. 208-213.
Vargha et al., "Behavior of Polyethylene Films in Soil, Periodica Polytechnica Chemical Engineering," DOI: 10.3311/PPch. 8281, Creative Commons Attribution, 2016, pp. 60-68.
Vargha, et al., "Behavior of Polyethylene Films in Soil" published in Periodica Polytechnica Chemical Engineering, Nov. 5, 2015 pp. 60-68.
Wootthikanokkhan, et al., "Effect of Blending Conditions on Mechanical, Thermal, and Rheological Properties of Plasticized Poly(lactic acid)/Maleated Thermoplastic Starch Blends," Journal of Applied Polymer Science, 2012, vol. 124, pp. 1012-1019.
Yoshida, et al., "A Bacterium that Degrades and Assimilates Poly(ehylene terphthalate)" Sciense Magazine vol. 351 Issue 6278 Mar. 11, 2016 pp. 1196-1199.
Yu et al., "Morphology and Mechanical Properties of Immiscible Polyethylene/Polyamide12 Blends Prepared by High Shear Processing," Chinese Journal of Polymer Science, 2017, 35(9):1132-1142.

(56) References Cited

OTHER PUBLICATIONS

Zhang et al., "Retrogradalion and Antiplasticization of Thermoplastic Starch," Richardson Centre for Functional Foods and Nutraceuticals, University of Manitoba, www.intechopen.com, 19 pages. 2012.
Zhang, et al. "Retrogradation and Antiplasticization of Thermoplastic Starch" Mar. 2012.
Zhong et al., "Biodegradable polymers and green-based antimicrobial packaging materials: A mini-review," Advanced Industrial and Engineering Polymer Research, vol. 3, 2020, pp. 27-35.
"APR Position Statement—Degradable Additives Use in Bottles, Forms and Films" The Association of Postconsumer Plastic Recyclers, http://plasticsrecycling.org/about/position-statements, Apr. 27, 2015, 1 page.
"Background on Biodegradable Additives" BPI, Feb. 12, 2010.
"BPI Position on Degradable Additives" Feb. 2010, 6 pages.
"Case Study: Compostable vs Oxo Degradable" Natur Bag, Feb. 19, 2019.
"Compostable Plastics 101: An Overview of Compostable Plastics Sponsored by the California Organics Recycling Council" based on information and belief, available at least as early as 2012, 23 pages.
"Discover Polysaccharides" Available at http://polysac3db.cermav.cnrs.fr/discover_starch.html; Accessed Feb. 16, 2017, 10 pages.
"Environmentally Degradable Plastics," Leonardo Da Vinci Program, Contract Nol 1/98/2/05261 /PI/11.1.1.b/CONT, 202 pages. May 4, 1999.
"French Proposal for Law on Biodegradable Plastics" Oxo-Biodegradable Plastics Association, Revised Oct. 31, 2013.
"Oxo-Biodegradable Plastics and Other Plastics with Additives for Degradation" European Bioplastics BackGround Oct. 2015, 5 pages.
"Position Paper on Degradable Additives" SPI Bioplastics Division, issued Feb. 2016.
"Report from the Commission to the European Parliament and the Council on the Impact of the Use of Oxo-Degradable Plastic, Including Oxo-Degradable Plastic Carrier Bags, on the Environment" European Commission, Brussels, Jan. 16, 2018.
"The Flexible Packaging Association Position on Degradable Additives" FPA, Jun. 21, 2010.
"What Are Oxo-biodegradable Additives" MJS Packaging, May 8, 2014.
"Biodegradation of starch-polyethylene films in soil and by microbial cultures", Nov. 1997, Dave, et al. World Journal of Microbiology and Technology, 13, 655-68., World Journal of Microbiology and Technology, 655-668, 13.
Ahmed et al. "Biodegradation of plastics: current scenario and future prospects for environmental safety." Environmental Science and Pollution Research 25.8 7287-7298. p. 7 col. 1 paragraph 2; Table 1; and Figure 1., Mar. 2018.
Applicant's Transmittal Letter labeled Information Disclosure Statement Under 37 CFR 1.97 dated Sep. 26, 2018.
Arevalo-Nino et al., "Starch-based extruded plastic films and evaluation of their biodegradable properties" Biodegradation 7: 231-237, 1996.
Arvanitoyannis et al., Biodegradable films made from low density polyethylene (LDPE), rice starch and potato starch for food packaging applications: Part 1, Carbohydrate Polymers, vol. 36, (1998), pp. 89-104.
Bastioli et al. "Starch in Polymers Technology" ACS Symposium Series, Jan. 1, 2012, American Chemical Society/Oxford University Press, XP055490447, vol. 1114, pp. 87-112.
Biodegradable Plastics Standard to Bust Landfill Waste, ENSO Plastic Blog, printed Feb. 20, 2019, 3 pages.
Braskem "Life Cycle Assessment of Green Plastic" Available as early as Mar. 28, 2017, accessed at http://www.braskem.com_site.aspx_plastic-green, 18 pages.
Campo, E. Alfredo, Polymeric Materials and Properties, Science Direct, 2018.
Cardia Biohybrid, Film Blowing/ Blow Moulding Resin, Sep. 8, 2017.
Cardia Bioplastics FAQ [online] [site accessed Oct. 23, 2018] URL: http://www.cardiabioplastics.com/our-business/fag.
Cardia Compostable B-F, Blown Film Resin, Biodegradable during Composting in Professionally Managed Facilities, CBP Technical Data Sheet, 110317, 2 pages. 2019.
Chen et al. "Environmental Degradation of Starch/Poly (Lactic Acid) Composite in Seawater" Apr. 6, 2010.
Chen et al., "Environmental Degradation of Starch/Poly(Lactic Acid) Composite in Seawater," Key and Open Laboratory of Marine and Estuarine Fisheries Ministry of Agriculture, East China Sea Fisheries Research Institute, Chinese Academy of Fishery Sciences, Polymers and Polymer Composites, vol. 19, No. 7, 2011, pp. 559-566.
Corn Starch/Fisher Scientific, 3 pages [online] [site accessed Sep. 18, 2020] url: https://www.fishersci.com/shop/products/corn-starch-2/S25580 (undated).
De Guzman "Coca-Cola produces 100% Bio-Based PET Bottle" Green Chemicals Blog, Jun. 9, 2015, 3 pages, accessed on Mar. 28, 2017 at https://greenchemicalsblog.com/2015/06/09/coca-cola-produces-100-bio-based-pet-bottle/ 3 pages.
Droge et al, WO 2016/134994 Machine Translation, Sep. 1, 2016 (Year: 2016).
Emmanuel Schwach "Starch-based biodegradable blends: morphology and interface properties," Polymer International, 2004, pp. 2115-2124.
English Abstract of BY 21006 C1. Apr. 2017.
Esmaeili, Atefeh, et al. "Biodegradation of Low-Density Polyethylene (LDPE) by Mixed Culture of Lysinibacillus xylanilyticus and Aspergillus niger in Soil." PLoS One 8(9): e71720, Sep. 23, 2013. https://doi.org/10.1371/journal.pone.0071720. Accessed Apr. 16, 2018.
Eyheraguibel, et al. "Characterization of oxidized oligomers from polyethylene films by mass spectrometry and NMR spectroscopy before and after biodegradation by a Rhodococcus rhodochrous strain" Chemosphere 184, 2017, pp. 366-374.
Final Office Action received for U.S. Appl. No. 14/853,725, dated Nov. 8, 2017.
Final Office Action received for U.S. Appl. No. 14/853,780, dated May 24, 2017.
Final Office Action received for U.S. Appl. No. 15/481,806, dated Nov. 6, 2019.
Final Office Action received for U.S. Appl. No. 15/481,823, dated Jul. 12, 2019.
Final Office Action received for U.S. Appl. No. 15/481,823, dated Jul. 20, 2020.
Final Office Action received for U.S. Appl. No. 15/481,823, dated Oct. 12, 2018.
Final Office Action received for U.S. Appl. No. 15/691,588, dated Dec. 9, 2019.
Final Office Action received for U.S. Appl. No. 15/836,555, dated Feb. 7, 2020.
Final Office Action received for U.S. Appl. No. 15/836,555, dated Nov. 30, 2020, 27 pages.
Fine Chemical Engineering Green Production Process, I st edition, edited by Qihuang Song, Guangdong Science & Technology Press, published on Mar. 31, 2006, p. 174.
Fujisawa, et al. "Degradation of Polyethylene and Nylon 66 by the Laccase-Mediator System" Journal of Polymers and the Environment, vol. 9, Issue 3, 2001, pp. 103-108.
Gadhave et al., Starch Based Bio-Plastics: The Future of Sustainable Packaging, Open Journal of Polymer Chemistry, 2018, vol. 8, pp. 21-33.
Gilfillan, "Developing Starch-Based Polymer Composites", Doctor of Philosophy, 2015, pp. 1-128.
Gupta, Apeksha et al. "Visible Range Photocatalysts for Phase Photocatalytic Degradation of Polyethylene and Polyvinyl Chloride" Journal of the Chilean Chemical Society, [S.I.], v. 62, n. 1, Jun. 2017. ISSN 0717-9707. <https://jcchems.com/index.php/JCCHEMS/article/view/156>. Accessed: Apr. 20, 2018.
Huagong et al., "Green Manufacturing Process of Fine Chemical Industry", 2006, Guangdong Science & Technology Press (National Outstanding Press).
Ibbrucker, Constance "Can Additives make plastics biodegradable?" Bioplastics Magazine Jan. 2017, 1 page.
Machine translation of JP-2008013602-A (Year: 2008).

(56) References Cited

OTHER PUBLICATIONS

Non-Final Office Action received for U.S. Appl. No. 16/391,909, dated Dec. 1, 2020, 10 pages.
Notice of Allowance received for U.S. Appl. No. 15/481,806, dated Jan. 7, 2021, 11 pages.
Notice of Allowance received for U.S. Appl. No. 15/481,823, dated Dec. 9, 2020, 9 pages.
Notice of Allowance received for U.S. Appl. No. 15/481,823, dated Jan. 8, 2021, 2 pages.
Notice of Allowance received for U.S. Appl. No. 16/456,295, dated Dec. 15, 2020, 3 pages.
Notice of Allowance received for U.S. Appl. No. 16/456,295, dated Nov. 19, 2020, 11 pages.
Examiner Interview Summary received for U.S. Appl. No. 15/836,555, dated Mar. 29, 2021, 2 pages.
Non-Final Office Action received for U.S. Appl. No. 15/836,555, dated Apr. 13, 2021, 12 pages.
Non-Final Office Action received for U.S. Appl. No. 16/425,397, dated Feb. 5, 2021, 13 pages.
Notice of Allowance received for U.S. Appl. No. 15/691,588, dated Feb. 24, 2021, 11 pages.
Notice of Allowance received for U.S. Appl. No. 15/836,555, dated May 3, 2021, 6 pages.
Notice of Allowance received for U.S. Appl. No. 16/391,909, dated May 4, 2021, 9 pages.
Sumathi et al., "Production of laccase by *Cochliobolus* sp. isolated from plastic dumped soils and their ability to degrade low molecular weight PVC," Biochemistry research international 2016, vol. 2018, Jan. 1, 2016, pp. 1-10.
"Mask fire, environmental protection fire, degradable meltdown cloth will be the next tueyere?", https://mp.weixin.qq.com/s/r5PmKPpF1V2TkW9AYZQ2EA, Jun. 3, 2020.
"Succeeded in developing a pregelatinized rice manufacturing device without cooking rice", Yamagata University press release material, Aug. 6, 2013. Partial English translation provided.
Frankland, Jim, Extrusion: Where's the Data? The Importance of Melt Strength in Extrusion, Plastics Technology, https://www.ptonline.com/articles/what-about-melt-strength, Dec. 18, 2020.
La Fuente, et al., Ozonation of Cassava Starch to Produce Biodegradable Films, Sep. 5, 2019, International Journal of Biological Macromolecules, 713-720, 141 (2019).
Machine translation of CN 103087482 (Year: 2013).
Non-Final Office Action received for U.S. Appl. No. 16/925,952, dated Oct. 15, 2021, 9 pages.
U.S. Appl. No. 15/481,823.
U.S. Appl. No. 16/925,705.
U.S. Appl. No. 16/925,747.
U.S. Appl. No. 14/853,725, filed Sep. 14, 2015.
U.S. Appl. No. 15/481,806, filed Apr. 7, 2017.
"Novel Soil Biodegradable Mulch Film" Radical plastics, Excerpts from the Final Technical Report. Feb. 10, 2021.
Notice of Allowance received for U.S. Appl. No. 16/925,952, dated May 16, 2022, 2 pages.
Notice of Allowance received for U.S. Appl. No. 16/925,952, dated Feb. 9, 2022, 7 pages.
U.S. Appl. No. 15/836,555, filed Dec. 8, 2017.
U.S. Appl. No. 16/925,705, filed Jul. 10, 2020.
U.S. Appl. No. 16/925,747, filed Jul. 10, 2020.
U.S. Appl. No. 17/327,536, filed May 21, 2021.
U.S. Appl. No. 17/327,577, filed May 21, 2021.
U.S. Appl. No. 17/327,590, filed May 21, 2021.
U.S. Appl. No. 63/033,676, filed Jun. 2, 2020.
Non-Final Office Action received for U.S. Appl. No. 16/925,705, dated Aug. 23, 2022, 12 pages.
Ohtake, Y. et al., "Development of Biodegradable LOPE Compound and the Estimation of Its Biodegradability and Its Application to Field of Civil Engineering", Journal of the Chemical Society of Japan (chemistry and industrial chemistry), 1996, No. 10, pp. 853-860 (English abstract).
"Practical Technology on Improving Plastic Function", Edition 1,Author Xu, Tongkao,p. 99, China Light Industry Press.
Non-Final Office Action received for U.S. Appl. No. 17/358,619, dated Jan. 30, 2023, 9 pages.
Otake et al., Development of biodegradable LDPE compound and the estimation of its biodegradability and its application to field of civil engineering, Oct. 10, 1996, Journal of the Chemical Society of japan, 9, 10, 1996, p. 853-860, Issue 298, https://www.osti.gov/etdeweb/biblio/438201.
Restriction Requirement received for U.S. Appl. No. 17/327,536, dated Dec. 2, 2022, 7 pages.
Restriction Requirement received for U.S. Appl. No. 17/327,577, dated Dec. 2, 2022, 6 pages.
Restriction Requirement received for U.S. Appl. No. 17/327,590, dated Dec. 2, 2022, 6 pages.
Song et al., "Starch nanoparticle formation via reactive extrusion and related mechanism study", Carbohydrate Polymers, vol. 85, 2011, pp. 208-214.
Tachibana, Y. et al., "Chemical Synthesis of Fully Biomass-Based Poly(butylene succinate) from Inedible-Biomass-Based Furfural and Evaluation of Its Biomass Carbon Ratio". Biomacromolecules 2010, 11, 2760-2765. (Year: 2010).

\* cited by examiner

BLENDING OF SMALL PARTICLE STARCH POWDER WITH SYNTHETIC POLYMERS FOR INCREASED STRENGTH AND OTHER PROPERTIES

CROSS-REFERENCE TO RELATED APPLICATIONS

This application claims the benefit under 35 U.S.C. 119(e) of U.S. Application No. 62/872,582 filed Jul. 10, 2019, U.S. Application No. 62/939,460 filed Nov. 22, 2019, and U.S. Application No. 62/962,706 filed Jan. 17, 2020, and is a continuation in part under 35 U.S.C. 120 of U.S. application Ser. No. 15/691,588 filed on Aug. 30, 2017 which is a continuation in part under 35 U.S.C. 120 of U.S. application Ser. No. 14/853,725 filed on Sep. 14, 2015 which claims the benefit under 35 U.S.C. 119(e) of U.S. Provisional Patent Application No. 62/187,231 filed on Jun. 30, 2015. U.S. application Ser. No. 15/691,588 is also a continuation in part under 35 U.S.C. 120 of U.S. application Ser. No. 14/853,780 filed on Sep. 14, 2015, and a continuation in part under 35 U.S.C. 120 of U.S. application Ser. No. 15/481,806 and Ser. No. 15/481,823, both filed on Apr. 7, 2017. U.S. application Ser. No. 15/691,588 also claims the benefit under 35 U.S.C. 119(e) of U.S. Provisional Patent Application No. 62/440,399 filed on Dec. 29, 2016, and U.S. Provisional Patent Application No. 62/442,432 filed on Jan. 4, 2017. The entire contents of each of the foregoing is incorporated by reference herein. Each of U.S. Provisional Patent Application No. 62/483,109, filed Apr. 7, 2017; U.S. patent application Ser. No. 16/391,909 filed Apr. 23, 2019; U.S. patent application Ser. No. 16/425,397 filed May 29, 2019; U.S. Patent Application No. 63/033,676 filed Jun. 2, 2020 and a U.S. Non-Provisional application Ser. No. 16/925,705, filed the same day as the present application, is also incorporated by reference herein, in its entirety.

BACKGROUND

Traditional petrochemical-based plastics are formulated to be strong, lightweight, and durable. For this reason, they are used in large quantities in countless consumer products. However, these plastics are generally not sourced from sustainable materials, are not biodegradable to any significant extent, and as a result, hundreds of millions of tons of plastic persist in landfills or in other natural environments (oceans, other waterways, in soil, etc.). In trying to reduce the amount of plastic waste, some articles typically produced using petrochemical-based plastics are being produced using more rapidly biodegradable materials, and/or include a fraction of components sourced from renewable sources.

Most petrochemical-based plastics materials, such as large quantities of polyethylene and polypropylene, as well as numerous other plastics (polyethylene terephthalate polyester, polystyrene, ABS, polyvinyl chloride, polycarbonate, nylon, and the like) are typically not readily biodegradable. Such is typically the case even for so called "green" plastics of such materials (e.g., green PE), which may be sourced from renewable sources (e.g., plant sources that are renewable within less than 100 years), rather than petro-chemical feedstocks. Even where it is possible to source some components of such materials from a renewable source, such materials tend to be significantly more expensive than available alternatives, and/or provide inferior physical properties. There are various tests for confirming green renewable content in plastics or other materials, e.g., as the ratio of $C^{14}$ to $C^{12}$ is elevated in renewable materials containing carbon, as compared to fossil fuel sourced materials. Such tests will be apparent to those of skill in the art While some of the literature describes attempts to incorporate starch or starch derivatives into blends of petrochemical or other plastic materials (e.g., polyolefins such as polyethylene), such attempts have met with little if any commercial success, due at least in part to resulting higher cost and/or inferior physical properties of the blends. One such reference, U.S. Pat. No. 8,841,362 to Favis, reports an increase in some strength characteristics, but only at very low starch loading levels. One particularly important shortcoming in Favis, is no increase in any strength characteristic is achieved at higher starch loading values (e.g., 15% or more). For example, in Table 1 Favis reports a blend of starch with polyethylene, in which dart drop or tear strength increased 18% relative to the unblended pure polyethylene in a blend with 12% thermoplastic starch (TPS). However, at 30% TPS, the dart drop strength showed a 18% decrease in strength relative to the pure polyethylene. Furthermore, while Favis reports increased dart drop strength at 6% and 12% TPS loading, Favis also reports that tensile strength decreased at all starch loading values, of 3% (6% drop in TS), 6% (9-10% drop in TS), and 12% (15-17% drop in TS). Favis thus considered it an advancement in the art to have even maintained 60% of the strength of the unblended pure polyethylene, after blending with TPS. Such results are some of the best reported in the literature (other than Applicant's), illustrating the difficulty with ongoing attempts to incorporate renewable starch materials into blends with polymeric resins, in order to reduce their synthetic or fossil-fuel derived content. In summary, the current state of the art for starch/polymer blends generally provides reduced strength at increased cost, which is not commercially viable.

It would be an advantage in the art to provide the ability to blend starch materials with a base polymeric resin material, in a manner that would consistently provide for comparable or improved strength and other physical properties, across a wide range of starch loading values (e.g., up to 15%, 20%, 25%, 30%, or 35%), and would allow introduction of an inexpensively sourced renewable starch component into such a blend in an inexpensive manner, where the blended material may have a cost comparable to the unblended pure polyethylene or other polymeric resin.

SUMMARY

Applicant's copending applications as incorporated by reference above disclose starch-based polymeric materials (e.g., thermoplastic starch material) that can be blended with various plastic resin materials, while maintaining desired strength and other physical characteristics of the material with which the renewable starch-based material is blended. In many cases, increases in various strength characteristics are provided, upon such blending. Such starch-based materials, available under the tradename NuPlastiQ, are believed to achieve a strong intermolecular bond between the starch-based material, and the plastic resin with which it is blended. Such strong bonding is in contrast to what is achieved in numerous earlier attempts to blend such plastic resins with starch or starch-based materials, where the starch or starch-based material simply acts as a filler, typically reducing strength and negatively affecting other physical properties.

Applicant has now found that at least some degree of such strengthened intermolecular bonding is believe to be achieved with more conventional starch materials, perhaps even a simple starch powder, where the starch or starch-based material is manufactured or otherwise treated to achieve a small particle size. For example, one method according to the present invention is directed to methods of blending small particle starch with a polymeric resin material, including the steps of providing a small particle starch or starch-based material having an average particle size of less than 1.5 µm (e.g., diameter) per particle, by providing another polymeric resin material, and by blending the starch or starch-based material into the polymeric material, so that the starch or starch-based material is intimately dispersed within the other polymeric resin material.

Such small particle starch materials may include starch powder, e.g., blended as a powder with the polymeric material. In some embodiments, the average particle size may be less than 1 µm (e.g., diameter), or even less than 150 nm (e.g., diameter).

Reduction of particle size in an initial starch, which may begin with particle sizes of larger than 1.5 µm (e.g., diameter), may be achieved through various mechanisms. In one embodiment, such reduction may be achieved by treating the initial starch with a larger particle size with ozone. For example, many starches as derived from potato, corn, or tapioca have an initial particle size greater than 5 µm, greater than 10 µm, or greater than 20 µm. It is believed that by reducing the size of the starch particles or domains, that they can be integrated into a polymeric resin matrix more uniformly, e.g., where it is theorized that stronger intermolecular bonding occurs between the small starch domains and the adjacent polymeric resin material. The size of starch particles may be determined by various methods, e.g., including but not limited to measuring diameter or other width in an SEM image.

Exemplary polymeric materials that may serve as the matrix material into which the present small particle starch materials may be blended include, but are not limited to polyethylene, polypropylene, other polyolefins, polystyrene, high impact polystyrene copolymers, polyesters (polyethylene terephthalate, PBAT, PLA, PHA, etc.), ABS, polyvinyl chloride, nylon, polycarbonate, and others. Combinations of various materials may be employed.

Blends of such plastics with the small particle starch material, may be heated (e.g., melted) for use in forming extruded plastic products, injection molded plastic products, blow molded plastic products, blown film plastic products, extruded or cast sheet or films, thermoformed plastic products, foamed plastic products, rotomolded plastic products, fiber plastic products, and the like using standard equipment of the plastics industry.

While NuPlastiQ is an example of a starch-based material that can provide the benefits described herein, it will be appreciated that the scope of the present invention extends broadly, to other small particle starches, or even to a material that may be synthesized from starting materials other than starch, which may achieve similar results due to the presence of the same or similar chemical structures or functional groups. For example, if a material having a chemical structure similar or identical to NuPlastiQ were synthesized (e.g., in a reactor) starting from non-starch materials, such is also within the scope of the present invention.

Further features and advantages of the present invention will become apparent to those of ordinary skill in the art in view of the detailed description of preferred embodiments below.

BRIEF DESCRIPTION OF THE DRAWINGS

In order that the manner in which the above-recited and other advantages of the invention are obtained, a more particular description of the invention briefly described above will be rendered by reference to specific embodiments thereof such as illustrated in the appended drawings. Understanding that these drawings depict only typical embodiments of the invention and are not therefore to be considered to be limiting of its scope, the invention will be described and explained with additional specificity and detail through the use of the accompanying drawings.

DETAILED DESCRIPTION

I. Definitions

Figure 1A:
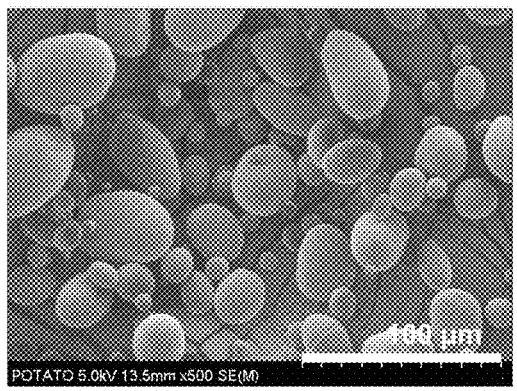
FIGS. 1A-1C are SEM images showing potato starch particles, corn starch particles, and cassava (tapioca) starch particles, respectively.

All publications, patents and patent applications cited herein, whether supra or infra, are hereby incorporated by reference in their entirety to the same extent as if each individual publication, patent or patent application was specifically and individually indicated to be incorporated by reference.

The term "comprising" which is synonymous with "including," "containing," or "characterized by," is inclusive or open-ended and does not exclude additional, unrecited elements or method steps.

The term "consisting essentially of" limits the scope of a claim to the specified materials or steps "and those that do not materially affect the basic and novel characteristic(s)" of the claimed invention.

The term "consisting of" as used herein, excludes any element, step, or ingredient not specified in the claim.

The terms "a," "an," "the" and similar referents used in the context of describing the inventive features (especially in the context of the following claims) are to be construed to cover both the singular and the plural, unless otherwise indicated herein or clearly contradicted by context. Thus, for example, reference to a "starch" can include one, two or more starches.

"Film," as used herein, refers to a thin continuous article that includes one or more polymeric materials that can be used to separate areas or volumes, to hold items, to act as a barrier, and/or as a printable surface.

"Bag," as used herein, refers to a container made of a relatively thin, flexible film that can be used for containing and/or transporting goods.

"Bottle," as used herein, refers to a container that can be made from the presently disclosed plastics, typically of a thickness greater than a film, and which typically includes a relatively narrow neck adjacent an opening. Such bottles may be used to hold a wide variety of products (e.g., beverages, personal care products such as shampoo, conditioner, lotion, soap, cleaners, and the like).

Unless otherwise stated, all percentages, ratios, parts, and amounts used and described herein are by weight. Unless stated otherwise, molecular weight values are for weight average molecular weights.

Numbers, percentages, ratios, or other values stated herein may include that value, and also other values that are about or approximately the stated value, as would be appreciated by one of ordinary skill in the art. A stated value should therefore be interpreted broadly enough to encompass values that are at least close enough to the stated value to perform a desired function or achieve a desired result, and/or values that round to the stated value. The stated values include at least the variation to be expected in a typical manufacturing process, and may include values that are within 25%, 15%, 10%, within 5%, within 1%, etc. of a stated value. Furthermore, the terms "substantially", "similarly", "about" or "approximately" as used herein represent an amount or state close to the stated amount or state that still performs a desired function or achieves a desired result. For example, the term "substantially" "about" or "approximately" may refer to an amount that is within 25% of, within 15% of, within 10% of, within 5% of, or within 1% of, a stated amount or value.

Some ranges are disclosed herein. Additional ranges may be defined between any values disclosed herein as being exemplary of a particular parameter. All such ranges are contemplated and within the scope of the present disclosure. Further, recitation of ranges of values herein is intended to serve as a shorthand method of referring individually to each separate value falling within the range. Unless otherwise indicated herein, each individual value is incorporated into the specification as if it were individually recited herein.

All numbers expressing quantities of ingredients, constituents, conditions, and so forth used in the specification and claims are to be understood as being modified in all instances by the term "about". Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

The phrase 'free of' or similar phrases as used herein means that the composition comprises 0% of the stated component, that is, the component has not been intentionally added to the composition. However, it will be appreciated that such components may incidentally form under appropriate circumstances, may be incidentally present within another included component, e.g., as an incidental contaminant, or the like.

Figure 2:
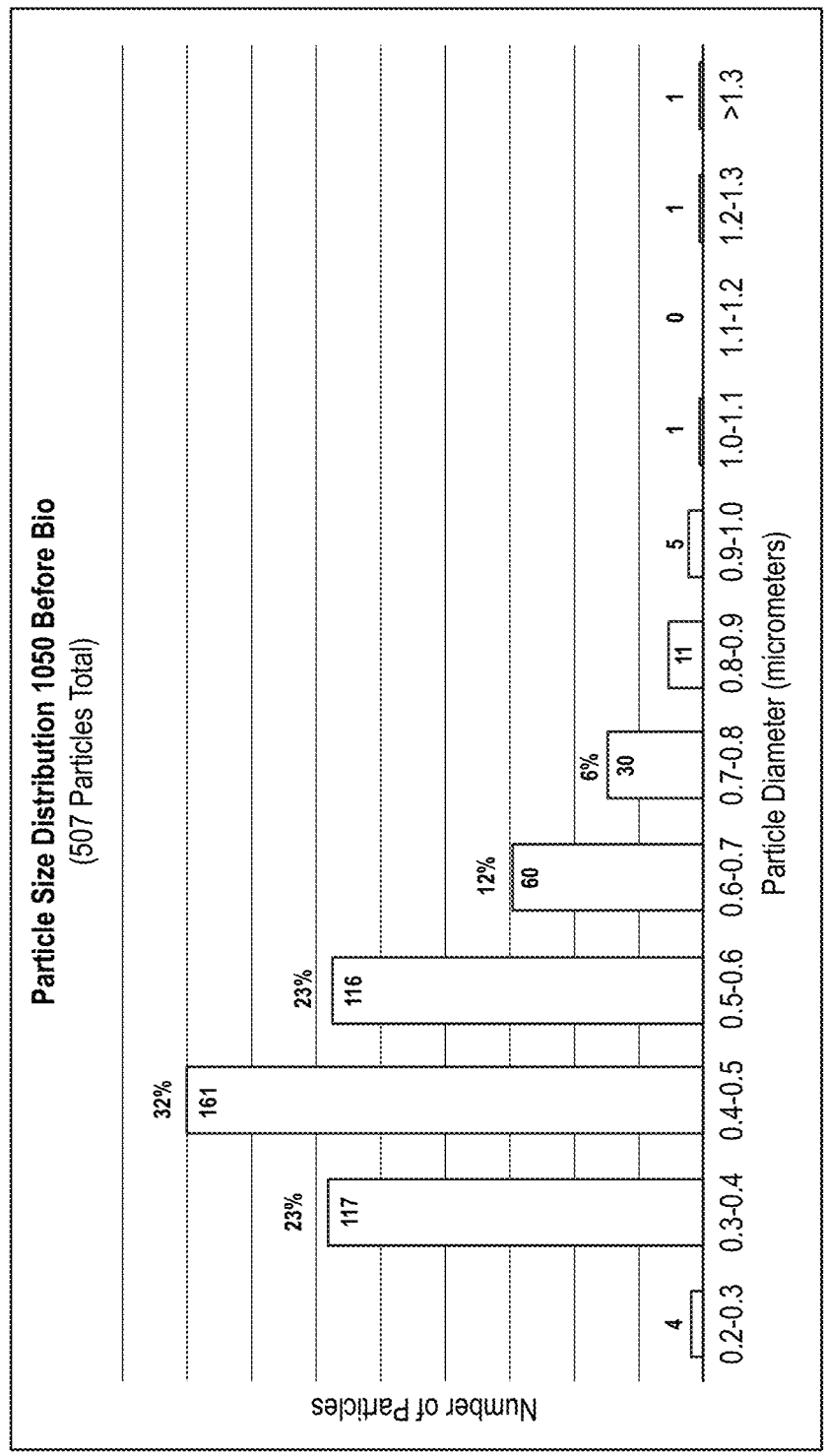
FIG. 2 shows an exemplary particle size distribution for starch or starch-based particles used in the present blends.

The phrase 'substantially free of' or similar phrases as used herein means that the composition preferably comprises 0% of the stated component, although it will be appreciated that very small concentrations may possibly be present, e.g., through incidental formation, incidental contamination, or even by intentional addition. Such components may be present, if at all, in amounts of less than 1%, less than 0.5%, less than 0.25%, less than 0.1%, less than 0.05%, less than 0.01%, less than 0.005%, or less than 0.001%. Particularly in the context of statements that the small particle starch is substantially free of particles sized larger than a given size (e.g., 1.5 µm), it is meant that the content of such may be below the fractions noted above, or that such content is not detectable within the blend or the small particle starch. Such percentages may be on a weight basis, or on a basis based on the number of particles (e.g., as shown in FIG. 2).

The term "non-biodegradable" as used herein with regard to a material means that the native material (free of additives added to render it biodegradable) does not degrade (particularly biodegrade), e.g., to carbon dioxide or methane to a significant extent in a reasonable limited time period (e.g. one year, 3 years, or 5 years) when exposed to various simulated disposal conditions, (e.g., ASTM D-5338, ASTM D-5511, and/or ASTM D-6691). However, it is understood that given enough time and exposure to conditions of sunlight, oxygen and degrading microbes, most polymeric materials (e.g., even those that are typically considered "non-biodegradable") will eventually degrade or even biodegrade, usually to some limited extent, over an extended time (e.g., decades or centuries).

The term "biodegradable" as used herein with regard to a material means that the material as described herein does biodegrade to base molecules such as carbon dioxide, methane and/or water, within a reasonable limited time frame (e.g., 5 years, 3 years, 2, years, 1 year, etc.) under such conditions (e.g., ASTM D-5338, ASTM D-5511, ASTM D-5526 and/or ASTM D-6691).

The term "particle size" as used herein refers to a length, width, or diameter (in the case of generally spherical particles) of particles of the starch or starch-based material included in the present blends. For example, the "particle size" may refer to the largest length, width or diameter measurement of a given particle. Such measurement may be made in conjunction with an SEM imaged cross-section, where the size (e.g., visible diameter) of such particles can be measured. By way of example, volume of a substantially spherical particle may be calculated as $4/3 \cdot \pi \cdot r^3$, using a measured particle radius (i.e., half a diameter). Volume of other shaped particles could also be determined, e.g., by other various suitable methods.

The term "modified" as used, e.g., in describing "modified starch" and the like, refers to physical and/or chemical modifications, including the conversion of a starting starch material to one that includes a lower molecular weight. Such mechanical and/or chemical modifications may include mechanical modification of amylopectin starch component (s) to a more linear amylose structure. The foregoing descriptions are merely exemplary, and it will be appreciated that numerous modifications to such starch components are possible. Applicant's NuPlastiQ material is an example of a modified starch-based material.

In reference to various standardized tests (e.g., ASTM or other tests), it will be understood that reference to any such standard refers to the latest update (if any) of such standard.

II. Introduction

The present disclosure is directed to, among other things, blends of starch or starch-based materials with another polymeric material, where the starch or other starch-based material exhibits extremely small average particle sizes, with relatively tight particle size distribution characteristics, so as to be is intimately and homogeneously dispersed within the other polymeric material. In an embodiment, the small particle starch dispersed in the polymeric material may simply comprise starch powder, e.g., intimately dispersed, to exhibit extremely small particle sizes.

While the literature describes earlier blends of starch or TPS materials with polyethylene or other polymeric resins, there have been significant incompatibilities between such starch-based components and typical polymeric resins with which they are blended, e.g., typically requiring significant fractions of compatibilizers to even achieve the blend (e.g., at least 9% of such expensive compatibilizers in numerous references to Broyles). Even where such compatibilizers are present, as a practical matter, it has not been possible to achieve an intimate, homogenous dispersion of the starch-based material within the other polymeric material. Rather, what occurs is the aggregation of relatively large starch particles (islands) within the matrix (which includes substantially pure regions of the matrix material, without any starch), or even a continuous or substantially continuous starch phase within the matrix. In any case, it can be extremely difficult to achieve good dispersion of particles. For example, articles formed by blending the small particle starch-based materials such as NuPlastiQ as described herein with a conventional plastic material do not have large "sea-island" particle size features that are common when blending conventional TPS materials with polymeric materials such as polyethylene.

For example, U.S. Pat. No. 6,605,657 to Favis describes blends, but where the starch phase is actually continuous, or substantially continuous. Within such blends, particle size may have little if any meaning, as even if starch grains were relatively small, they are adjacent to other starch grains, such that the starch is not homogenously or intimately dispersed as discrete starch or starch-based particles, where each starch particle is generally separate from other starch particles, surrounded by the polymeric matrix material. U.S. Pat. No. 8,841,362 to Favis describes similar blends, but in which the '657 Favis material is "reprocessed by melt-processing . . . to provide materials" having properties, that exhibited strength characteristics that were better than '657 Favis, e.g., maintaining 40% or more of their strength, as compared to the pure polymer that the starch was blended with. While Favis '362 notes that reprocessing seems to result in more discontinuous starch phase distribution as compared to the material in Favis '657, Favis also found that his discontinuous starch domains were less accessible to biodegradation, because the starch domains were discontinuous, encapsulated by the non-biodegradable polymer (col. 8 lines 56-61 of Favis '362). Table 9 of Favis '362 shows starch/polyethylene blends of 94% PE/6% starch, 88% PE/12% starch, and 70% PE/30% starch, with average particle sizes of 0.9 µm, 0.7 µm, and 0.7 µm, respectively. Notably, there are also significantly larger particles present in the Favis '362 blends, as the range of particle sizes for such blends are reported as 0.2-2.6 µm, 0.2-3.0 µm, and 0.2-2.5 µm, respectively. The size of such starch particles are not particularly tightly distributed, but include far larger particles, in addition to the smaller particles. Thus, even if Favis may have a small average particle size, there are a significant number of far larger particles present, which is problematic. In contrast, the present invention is directed to use of small particle starch, where the particle size is tightly distributed, and/or even smaller particle sizes are achieved, which enhances the strength and other characteristics of the resulting blend as compared to Favis and any other art Applicant is aware of.

By way of example, the presence of large starch particles (even where very small particles may also be present) within the blend exacerbates problems associated with attempts to form very thin films, particularly where such films are blow formed. The present invention employs a starch or starch-based material that has very small "domain" size, tight particle size distribution (e.g., low standard deviation) and which maintains or assumes very small particle sizes when blended into the polymeric material with which the starch material is paired.

The degree of hydrophobicity exhibited by the starch employed may also affect its ability to be dispersed into a polymeric matrix so as exhibit very small average particle size values, with tight distribution around the average particle. It is theorized to be important that the starch material not simply act as a filler, but that it form strong intermolecular bonds between the starch and the adjacent polymeric material, so that key strength and other characteristics of the polymer are not degraded, when significant quantities of the starch are loaded into the blend (e.g., at least 20%, 25%, 30%, or 35% starch).

It is well-known within the field that blends of starch with a non-biodegradable polymer material can exhibit some biodegradability, because of the biodegradable starch content. It goes without saying that such conventional blends exhibit biodegradability characteristics where the percentage of the blend biodegraded over a typical test period (e.g., up to 1 year, 3 years, or even 5 years) is no more than the starch content of the blend. In Applicant's other applications, Applicant has surprisingly demonstrated that it's NuPlastiQ starch-based material, when blended with such non-biodegradable polymers, exhibits percentages of biodegradation for the blend that are actually greater than the starch content of the blend. Such is an enormous advantage of Applicant's NuPlastiQ product.

Also differing from Favis '362, Applicant has developed blends of its NuPlastiQ starch-based material and various polymers (e.g., including polyolefins), where substantially the entire blend is biodegradable within a relatively short period of time (e.g., 5 years, 3 years, or even 1 year), under standardized conditions simulating an anaerobic digester, an aerobic digester, industrial compost, or other disposal conditions (e.g., as dictated by the relevant ASTM tests). Favis '362 notes that the discontinuous distribution of its starch material within the matrix reduces the overall biodegradability of the blend, as only the starch is ever potentially biodegradable, and where the starch domains are encapsulated in polyethylene or another non-biodegradable polymer, they cannot be reached by the microbes responsible for biodegradation. In the present blends, biodegradability can actually be enhanced by the discontinuity, and the small starch particle size, in contrast to Favis. For example, where the starch is present as a far higher number of very small particles that are homogenously distributed, such as in the present invention, the starch is believed to aid in whatever mechanism is responsible for lending significantly increased biodegradability to the polymeric material (e.g., even polyethylene) with which the starch-based material is blended. For example, without being bound to theory, it may be that microbes biodegrading one of Applicant's very small starch particles continues biodegrading after reaching the boundary with the polymeric material, and because of the proximity of the next very small starch particle, the microbes are able to "eat" the thin matrix material, until they encounter the next starch particle. This is possible because of the very intimate dispersion of the very small starch particles within the polymer matrix, allowing the microbes to "munch" on the bordering matrix polymeric material for a short time, until they reach the next very small starch particle. Such process continues, until the blend as a whole can actually be substantially completely biodegraded, even with notoriously non-biodegradable polymeric materials such as polyethylene, polypropylene, and polystyrene. $C^{14}/C^{12}$ analysis of tested materials after respirometry-based biodegradation testing confirms that both the starch and the otherwise non-biodegradable polymer (e.g., polyethylene) are in fact being biodegraded at approximately equal rates, according to their concentration in the blend (i.e., that the ratio of petrochemically sourced "fossil" or "old" carbon to "renewable" or "new" carbon does not change significantly after such respirometry testing (e.g., under ASTM D-5511 or ASTM D-5338). In other words, a blend including about 20% NuPlastiQ before such respirometry-based biodegradation testing still includes about 20% NuPlastiQ after such biodegradation, even where 50% or more of the total carbon atoms in the blend may have been converted during biodegradation to $CO_2/CH_4$, such that both the polyethylene or other non-biodegradable matrix material and the NuPlastiQ are biodegrading at approximately equal rates, according to their initial concentration in the blend.

Additional details relative to biodegradability and enhanced strength characteristics are described in Applicant's earlier applications. The ability to now consistently achieve small particle sizes, with tight particle size distribution, enhances the ability of Applicant to consistently deliver enhanced strength, as well as increase biodegradability.

The present articles (films or otherwise) can be produced by mixing the small particle starch or starch-based material with the other polymeric material (e.g., a polyolefin or other plastic resin), heating the mixture, and molding (e.g., injection molding) the mixture, extruding the mixture, blow molding the mixture, blow-forming the mixture (e.g., forming a blown film), thermoforming the mixture, or the like. Any of various plastic manufacturing processes suitable for use in forming a wide variety of articles can be used with the present blends.

The articles described herein can be produced in the form of any conceivable structure, including, but not limited to bottles, boxes, other containers, sheets, films, bags, and the like. Thin films for bags and film wraps (e.g., for wrapping around or over a product) can be made using blown film equipment.

Examples of suitable small particle starch-based materials that have been developed to consistently provide for very small particle sizes, and tight particle size distribution are available from BioLogiQ, under the tradename "NuPlastiQ". Specific examples of such include, but are not limited to 2019 and later grades of NuPlastiQ GP and NuPlastiQ CG. Specific characteristics of such NuPlastiQ materials are described in detail in Applicant's U.S. Application Nos. 62/872,582 and 62/939,460, already incorporated by reference in their entirety herein. Other small particle starches or small particle starch-based materials can also be used (e.g., even a native starch, treated to exhibit such small particle sizes) so long as such material provides the very small particle size characteristics described herein.

At least in the case of using NuPlastiQ as the small particle starch-based material, biodegradability of the blend is increased and/or accelerated. For example, in polymer/NuPlastiQ blends including polymers heretofore considered non-biodegradable, such as polyethylene, a substantial portion or substantially all of the carbon atoms in the blended product can be far more quickly converted by microorganisms into $CO_2$ and/or $CH_4$. In other words, NuPlastiQ can render polyethylene biodegradable when blended therewith, in a homogenous mixture, where the NuPlastiQ is intimately dispersed in the polyethylene. Additionally, when blending with polymers heretofore considered to be compostable or biodegradable, such as PBAT, the rate and/or extent of biodegradation may be further increased by addition of the small particle NuPlastiQ starch-based material. Similarly, where such a polyester material (PBAT or PLA) may be biodegradable under some circumstances (e.g., industrial compost conditions), by blending with NuPlastiQ, the polyester portion of the blend may become biodegradable under less aggressive conditions (e.g., home compost conditions). It is believed that similar benefits may be provided when using small particle starch, as well. The rate of microbial conversion depends on several factors such as thickness of the part, number of microorganisms, type of microorganisms, ratio of small particle starch or small particle starch-based material and other polymer in the product, type of plastics in the blend, the strength of the carbon bonds in the plastic, etc. It is believed that the particle size of the starch or starch-based material in the blend, as well as distribution characteristics thereof, may affect biodegradability. It is also possible that the small particle characteristics may be only partially responsible, e.g., where other characteristics included in the NuPlastiQ material, may also be needed to be present in a small particle starch for it to provide the benefits described herein. For example, the Favis small particle starch does not provide biodegradability benefits, as the polyethylene in those blends does not biodegrade, even if dispersed in a discontinuous manner. In fact, the encapsulated discontinuous starch does not even biodegrade in Favis, as it remains inaccessible (col. 8 lines 54-61 of Favis '362). Clearly, the characteristics of the presently described blends are different, as they do biodegrade, substantially entirely (i.e., not just the starch component).

III. Exemplary Articles and Methods

The present blends and processes can include one or more conventional plastic (e.g., polymeric) materials (e.g., including, but not limited to polyethylene, polypropylene, other polyolefins, polystyrene, ABS, polyvinyl chloride, nylon, or polycarbonate). Numerous other plastic materials, including those considered to be partially or wholly biodegradable or compostable (such as PBAT, PHA and/or PLA) are also contemplated for use in blending with small particle starch or small particle starch-based materials as described herein. Such plastic resin materials may be sourced from petrochemical sources, or from so-called "green" or renewable sources (e.g., "green" PE, bioPET, and the like). The small particle starch or starch-based materials and the conventional plastic materials can be provided in any desired form, such as pellets, powders, curdles, slurry, and/or liquids. The starch may be native starch powder, treated to exhibit small particle characteristics.

Such blends may be formed in manufacture into a desired article through any conceivable process. An example of such would be an extrusion process. For example, the conventional plastic material and the small particle starch or starch-based material can be fed into an extruder (e.g., into one or more hoppers thereof). The different materials can be fed into the extruder into the same chamber, into different chambers, at approximately the same time (e.g., through the same hopper), or at different times (e.g., through different hoppers, one being introduced into the extruder earlier along the screw than the other), etc. It will be apparent that many blending possibilities are possible.

A key characteristic of the present blends is that the selected starch or starch-based material have or be capable of forming very small particle sizes, as it becomes dispersed in the other polymeric material. Recently available starch-based materials from BiologiQ, under the tradename NuPlastiQ (e.g., NuPlastiQ GP and NuPlastiQ CG) differ from earlier similar materials, even those available from Applicant, so as to be capable of consistently providing the small particle sizes, tight particle size distribution, substantially homogenous distribution characteristics when blended into various other polymeric materials, as described herein. In an embodiment, other characteristics, such as hydrophobicity matching that of the plastic resin material being blended with, may be provided by the starch or starch-based material. Such matching of characteristics may further aid in the ability to intimately blend the small particle starch or starch-based material into the plastic resin material.

The starch or starch-based material can include or be formed from one or more starches from one or more plants, such as corn starch, tapioca starch, cassava starch, wheat starch, potato starch, rice starch, sorghum starch, and the like. In some embodiments, a mixture of different types of starches may be used, which Applicant has found to result in a synergistic increase in strength, in at least NuPlastiQ starch-based materials. In the case of a starch-based material, other materials may also be present. For example, a plasticizer may be present within the mixture of components from which a starch-based material is formed. Water may also be used in forming the starch-based material, although at least in the case of NuPlastiQ starch-based materials, only a small to negligible amount of water (e.g., less than 2%) is present in the finished small particle starch-based material.

In the case of a small particle starch-based material, such material can be formed from mostly starch. For example, at least 65%, at least 70%, at least 75%, or at least 80% by weight of the starch-based material may be attributable to the one or more starches. In an embodiment, from 65% to 90% by weight of the finished starch-based material may be attributed to the one or more starches. Other than negligible water content, the balance of the finished starch-based material may be or attributed to a plasticizer (e.g., glycerin). The percentages above may represent starch percentage relative to the starting materials from which the starch-based material is formed, or that fraction of the finished starch-based material that is derived from or attributable to the plasticizer (e.g., at least 65% of the starch-based material may be attributed to (formed from) the starch(es) as a starting material). Although some water may be used in forming a starch-based material, substantially the balance of the starch-based material may be attributed to glycerin, or another plasticizer. Very little residual water (e.g., less than 2%, less than 1.5%, typically no more than about 1%) may be present in the finished starch-based material. Small particle starch may be treated to also exhibit low residual water content.

By way of example, materials from which a starch-based material is formed can include at least 12%, at least 15%, at least 18%, at least 20%, at least 22%, no greater than 35%, no greater than 32%, no greater than 30%, no greater than 28%, or no greater than 25% by weight of a plasticizer. Such percentages may represent that fraction of the finished starch-based material that is derived from or attributable to the plasticizer (e.g., at least 12% of the starch-based material may be attributed to (formed from) the plasticizer as a starting material).

Exemplary plasticizers include, but are not limited to glycerin, polyethylene glycol, sorbitol, polyhydric alcohol plasticizers, hydrogen bond forming organic compounds which do not have a hydroxyl group, anhydrides of sugar alcohols, animal proteins, vegetable proteins, aliphatic acids, phthalate esters, dimethyl and diethylsuccinate and related esters, glycerol triacetate, glycerol mono and diacetates, glycerol mono, di, and tripropionates, butanoates, stearates, lactic acid esters, citric acid esters, adipic acid esters, stearic acid esters, oleic acid esters, other acid esters, or combinations thereof. Glycerin may work particularly well.

The small particle starch or finished starch-based material may include no greater than 5%, no greater than 4%, no greater than 3%, no greater than 2%, no greater than 1.5%, no greater than 1.4%, no greater than 1.3%, no greater than 1.2%, no greater than 1.1%, or no greater than 1% by weight water.

In some embodiments, mixtures of different starches may be used, either in the small particle starch, or in forming a starch-based material. Use of such a mixture of different starches (e.g., coming from different plants) has been found to surprisingly be associated with a synergistic increase in strength in articles, at least in the case of starch-based materials. In such a mixture of starches, a starch can be present in the mixture in an amount of at least 1%, at least 2%, at least 3%, at least 4%, at least 5%, at least 10%, at least 15%, at least 20%, at least 25%, at least 30%, at least 35%, at least 40%, no greater than 95%, no greater than 90%, no greater than 85%, no greater than 80%, no greater than 75%, no greater than 70%, no greater than 65%, no greater than 60%, no greater than 55%, no greater than 50%, or from 10% to 50% by weight relative to the combined weight of the plurality of starches. Some non-limiting exemplary mixtures may include 90% of a first starch, and 10% of a second starch, or 30% of a first starch and 70% of a second starch, or 50% of a first starch and 50% of a second starch. Mixtures of more than two starches (e.g., using 3 or 4 different starches) can also be used. Such increased strength resulting from use of mixtures of starches is described in Applicant's U.S. Pat. No. 10,214,634, and U.S. application Ser. No. 16/287,884 filed Feb. 27, 2019, each of which is herein incorporated by reference in its entirety.

Additional details relative to fractions of starch and glycerin or other plasticizers used in forming starch-based materials are described in Applicant's other patent applications, already incorporated herein by reference. Physical characteristics for NuPlastiQ GP are shown in Table 1 below. Properties of density, melt flow index, melting temperature, tensile strength, Young's modulus, elongation at break, dart impact, and water content are believed to be representative of other NuPlastiQ materials. Some characteristics may vary somewhat (e.g., ±25%, or ±10%) from values shown in Table 1. While some of the properties may be similar to other thermoplastic starch materials, others may differ markedly from typical starch-based materials. For example, the density of such reactively extruded NuPlastiQ materials is particularly high, e.g., greater than 1 g/cm$^3$, at least 1.1 g/cm$^3$, at least 1.2 g/cm$^3$, or at least 1.25 g/cm$^3$, (e.g., the 1.4 g/cm$^3$, as shown in Table 1).

TABLE 1

| PROPERTY | TEST METHOD | NuPlastiQ GP NOMINAL VALUE |
|---|---|---|
| Density | ASTM D-792 | 1.40 g/cm$^3$ |
| THERMAL PROPERTIES | | |
| Melt Flow Index 200° C./5 kg | ASTM D-1238 | 1.98 g/10 min |
| Melting Temp. Range | ASTM D-3418 | 166-180° C. |
| MECHANICAL PROPERTIES | | |
| Tensile Strength @ Yield | ASTM D-638 | >30 MPa |

TABLE 1-continued

| PROPERTY | TEST METHOD | NuPlastiQ GP NOMINAL VALUE |
|---|---|---|
| Tensile Strength @ Break | ASTM D-638 | >30 MPa |
| Young's Modulus | ASTM D-638 | 1.5 GPa |
| Elongation at Break | ASTM D-638 | <10% |
| Impact Resistance (Dart) | ASTM D-5628 | 3.5 kg |
| ADDITIONAL PROPERTIES | | |
| Water Content | ASTM D-6980 | ≤1.5%, or ≤1% |

The NuPlastiQ materials have a low water content, as described. As this material absorbs moisture, it exhibits plastic behavior and becomes flexible. When removed from a humid environment, the material dries out and becomes stiff again (e.g., again exhibiting less than about 1% water content). The moisture present in NuPlastiQ (e.g., in pellet form) may be released in the form of steam during processing (e.g., extrusion, film blowing, injection molding, blow molding, etc.). As a result, films or other articles produced from a starch-based material such as NuPlastiQ blended with another plastic material may exhibit even lower water content, as the other plastic material typically will include no or negligible water, and the water in the NuPlastiQ may typically be released during manufacture of a desired article.

Low water content in any starch-based material, as well as hydrophobic, rather than hydrophilic characteristics thereof, can be important, as significant water content (or hydrophilicity) can result in incompatibility with the other plastic material (which is typically hydrophobic) with which the starch-based material is blended. Water content is particularly a problem where the article requires formation of a thin film. For example, as the water vaporizes, this can result in voids within the film or other article, as well as other problems. When blowing a thin film, any starch-based material used may preferably include no more than about 1% water. By matching hydrophobicity between the starch-based material and the polymeric material blended therewith, this can also aid in achieving the desired very small particle sizes for the starch or starch-based material dispersed within the polymeric material matrix.

Low water content is not achieved in the NuPlastiQ material through esterification, as is common in some conventional TPS materials that may include relatively low water content. Such esterification can be expensive and complex to perform. Furthermore, the NuPlastiQ materials that are exemplary of exemplary starch-based materials employable herein have been mechanically, physically or chemically reacted and/or altered, compared to the starting starch and glycerin materials. For example, the starch-based material may be the product of a reactive extrusion process. While both the starch and glycerin starting materials are hydrophilic, the NuPlastiQ or another starch-based material can be hydrophobic. In other words, the starch-based material is not recognized as a simple mixture including native starch and glycerin. The low water content achievable in the starch-based material, as well as the exhibited hydrophobicity may be due at least in part to the physical or chemical alteration of the starch and plasticizer materials into a hydrophobic thermoplastic polymer, which does not retain water as may be the case with native starch, or other conventional thermoplastic starch materials.

Nevertheless, processing at relatively high temperatures may result in some release of volatized glycerin (e.g., visible as smoke). If needed (e.g., where stored pellets may have absorbed additional water), drying of pellets can be performed by simply introducing warm dry air, e.g., at 60° C. for 1-4 hours, which is sufficient to drive off any absorbed water. Pellets should be dried to less than about 1% moisture content prior to processing, particularly if forming a film. NuPlastiQ pellets may simply be stored in a sealed container with or without a desiccant in a dry location, away from heat to minimize water absorption, and to prevent undesired degradation.

In addition to NuPlastiQ or other starch-based material being thermoplastic, the NuPlastiQ may also be thixotropic, meaning that the material is solid at ambient temperature, but flows as a liquid when heat, pressure and/or frictional movement are applied. Advantageously, pellets of NuPlastiQ can be used the same as petrochemical based pellets (any typical plastic resin pellets) in standard plastic production processes. NuPlastiQ or other starch-based materials and products made therefrom may exhibit gas barrier characteristics. Products (e.g., films) made using such pellets exhibit oxygen gas barrier characteristics (e.g., see Examples of Applicant's previous filings for earlier versions of NuPlastiQ, already incorporated by reference). NuPlastiQ and other small particle starch-based materials may be non-toxic, made using raw materials that are all edible. NuPlastiQ and other starch-based materials and products made therefrom may be water resistant, even hydrophobic, but also water soluble. For example, NuPlastiQ may resist swelling under moist heated conditions to the point that pellets (e.g. with a size of 3-4 mm) thereof may not completely dissolve in boiling water within 5 minutes, but a pellet will dissolve in water at about 35-40° C. within about 10 minutes. That said, films comprising NuPlastiQ or another starch-based material may still have a surface wettability that is relatively low (e.g., 34 dynes/cm or less), similar to many typical polyolefins (e.g., polyethylene or polypropylene).

In addition, the NuPlastiQ or other starch-based material may be stable, in that it may not exhibit any significant retro gradation, even if left in relatively high humidity conditions. Of course, products made with NuPlastiQ or a similar small particle starch-based material may also exhibit such characteristics. If NuPlastiQ is stored in humid conditions, the excess absorbed water can simply be evaporated away, and once the water content is no more than about 1%, it can be used in forming a film or other article.

Similar to paper, NuPlastiQ does not typically undergo biodegradation under typical storage conditions, even in relatively humid conditions, as the other conditions typical of ASTM respirometry-based biodegradability test conditions are not present. Of course, where such conditions are present, not only does the NuPlastiQ biodegrade, but otherwise non-biodegradable plastic materials blended therewith surprisingly have been shown to biodegrade. It is believed that enhanced biodegradation may also occur with other small particle starches or starch-based materials, particularly where the small particles are characterized by tight particle size distribution (e.g., the absence of large particles) and/or intimate dispersion of such particles within the polymeric resin material it is blended with.

In some embodiments, a small particle starch or starch-based material could be provided in a masterbatch formulation that may include the starch or starch-based material, one or more other plastic materials, and optionally a compatibilizer. Such a masterbatch may include an elevated concentration of the starch or starch-based material, e.g., so as to be specifically configured for mixing with pellets of the same or another plastic material already included in the masterbatch, at the time of further processing where a given article is to be formed, effectively dropping the concentration of the starch-based material down to the desired final value (e.g., the masterbatch may be at about 50% starch or starch-based material, while a finished article may include 20-30%). Any conceivable ratios may be used in mixing such different pellets, depending on the desired percentage of starch or starch-based material and/or compatibilizer and/or conventional plastic material in the finished article.

NuPlastiQ and some other starch-based materials can include very low water content. For example, although raw starch (e.g., used in forming the starch-based material) may typically include about 13% bound water by weight, exemplary finished starch-based materials may include less than about 1% water (including bound water).

In an embodiment, the small particle starch or starch-based material may be substantially amorphous. For example, raw starch powder typically has approximately a 50% crystalline structure. By way of example, the starch or starch-based material used in making films according to the present disclosure may have a crystallinity of less than about 40%, less than about 35%, less than about 30%, less than about 25%, less than about 20%, less than about 15%, less than about 10%, less than about 9%, less than about 8%, less than 7%, less than about 6%, less than about 5%, or less than about 3%. Any suitable test mechanism for determining crystallinity may be used, e.g., including but not limited to FTIR analysis, X-ray diffraction methods, and symmetrical reflection and transmission techniques. Various suitable test methods will be apparent to those of skill in the art.

As described herein, blending of the small particle starch or starch-based material with a plastic material currently understood to be non-biodegradable can result in not just the starch or starch-based material being rapidly biodegradable, but the non-biodegradable plastic material actually becomes significantly more rapidly biodegradable (even where the other plastic material alone is not significantly otherwise biodegradable). Such results do not occur within previously reported blends, including those of Favis. Such results have been documented when blending at least with NuPlastiQ. It is believed that the small particle characteristics of the starch or starch-based component, as well as other factors, may allow such to occur. Such differences in biodegradability clearly illustrate that there are significant structural and/or chemical differences in the resulting films and other articles, as substantially the entire composite structure (i.e., the film or other structure) is now capable of being more rapidly biodegraded. "Substantially entirely biodegradable" may refer to at least 80%, at least 85%, or at least 90% biodegradability, or to a biodegradability that equals or exceeds the biodegradability of a cellulose positive control typically used in such respirometry testing (e.g., under ASTM D-5338 or ASTM D-5511). Small particle characteristics may also provide enhancements to physical properties, such as strength characteristics.

Without being bound to any particular theory, it is believed that the starch-based material (e.g., such as NuPlastiQ), may reduce the crystallinity of the blended products, interrupting the crystallinity and/or hygroscopic barrier characteristics of the polyethylene or other non-biodegradable plastic materials in a way that allows water and bacteria to degrade the arrangements and linkages of otherwise non-biodegradable plastic molecules of the blend, along with the intimately dispersed starch or starch-based material. The intimate dispersion of very small particles of the starch or starch-based component may also be important in any such mechanism, as microbes quickly encounter the other polymeric material, because the particles are so small, and well dispersed. Because of such dispersion, the microbes may continue "munching" on the polymeric material after consuming a given starch or starch-based particle, until they encounter the next adjacent starch or starch-based particle (which may be more easily digested). For example by way of theory, the long polymer chains of polyethylene or other non-biodegradable plastic material may be more easily broken by chemical and mechanical forces that exist in environments that are rich in bacteria and microorganisms, when homogenously blended with the presently contemplated small particle starches or starch-based materials. Subsequently, the microorganisms that exist naturally in a disposal environment (e.g., in an anaerobic digester) can consume the remaining smaller molecules so that they are converted back into natural components (such as $CO_2$, $CH_4$, and $H_2O$). That said, in at least the case of NuPlastiQ, the NuPlastiQ does not seem to promote fragmentation of the macro film or other structure into small pieces, but the films tend to biodegrade, as shown by the respirometry data, as well as corroborated by follow up soil inoculum forensic analysis, and $C^{14}/C^{12}$ analysis. It is believed that this degradation effect is further enhanced, and more consistently achieved, when the starch or starch-based component is intimately and homogenously dispersed, with the very small particle sizes (as well as other characteristics that differentiate from Favis, which does not exhibit such characteristics) as described herein.

For example, truly biodegradable plastics decompose into natural base elements or compounds such as carbon dioxide, methane, water, inorganic compounds, or biomass via microbial assimilation (e.g., the enzymatic action of microorganisms on the plastic molecules). Biodegradation of plastics can be enabled by first breaking down the polymer chains via either chemical or mechanical action but may only be fully accomplished through decomposition of the molecules by microbial assimilation.

Plastics made from petrochemical feedstocks or derived from plant sources begin life as monomers (e.g., single small molecules that can react chemically with other small molecules). When monomers are joined together, they become polymers ("many parts"), and may be known as plastics. Before being joined together, many monomers are readily biodegradable, although after being linked together through polymerization, the molecules become so large and joined in such arrangements and linkages that microbial assimilation by microorganisms is not practical within any reasonable time frame in most instances. However, the small particle starch or starch-based compositions described in the present invention can impart increased biodegradability.

Polyolefins such as rigid forms of polyethylene and polypropylene have a high degree of crystallinity and are made by converting monomer molecules (whether petroleum derived or derived from ethanol or other small building block molecules derived from plant sources) into long chain polymers. The bonds created when connecting the monomers to form long polymer chains are strong and difficult to break. Films and other articles formed from such polymeric materials are not biodegradable as defined herein, and have significant strength. Even where a given article is formed from a blend of conventional non-biodegradable plastic material and conventional thermoplastic starch "TPS" (as described in Favis and numerous other references), it does not acquire significant biodegradability characteristics (other than the starch portion of the blend which may sometimes biodegrade, where it is a continuous phase that is accessible to microbes). In addition, the strength of such a blend is reduced as a result of inclusion of the TPS material, particularly at elevated starch loading levels (e.g., 15% or more, 20% or more). While Favis shows a small increase in strength (+18% dart drop) at loading levels of up to 12.5%, strength is decreased at a 30% starch loading. All other references Applicant is aware of show a decrease in strength, at all loading levels.

In addition to biodegradability, the resulting blend may often have a higher elastic modulus (stiffness, or strength) than polyethylene or other plastic material included in the blend, so as to be useful for making plastic films or other articles that are stronger than the same articles made with pure polyethylene or other pure conventional plastic material. By ensuring that the particle size is very small as described herein, and by ensuring that the small particle starch or starch-based material is uniformly spread throughout the material, benefits are provided, as described herein. In addition, a starch-based material such as NuPlastiQ may have a relatively high Young's modulus and/or tensile strength value, so as to serve as a strengthening agent that is believed to form strong intermolecular bonds with the materials in the blend, rather than a typical filler, which weakens the blend. For example, the starch-based material can have a Young's modulus (e.g., about 1.5-2 GPa) and/or tensile strength value that is higher than the conventional polymer with which it is being blended. While perhaps not completely understood, it is believed that consistent achievement of the small particle size and tight distribution characteristics as described herein is at least partially responsible for achievement of increased strength within the contemplated blends.

While blending NuPlastiQ with another polymer in many cases results in increased strength, it will be appreciated that NuPlastiQ can also be blended with various specific polymers, which may already exhibit significantly high strength characteristics, where the blending may not result in an increase in strength, or may even decrease the strength of the blend, by comparison. Such embodiments are still within the scope of the present disclosure and invention, e.g., where the dispersion and small particle size characteristics as described herein are provided, and other benefits (e.g., increased renewable content, biodegradability, or the like), while still providing sufficient strength for a given purpose, may be achieved.

When preparing the blend, mixing of the one or more other plastic materials and the one or more small particle starch materials or starch-based materials can be performed using one or more mixing devices. In a particular implementation, a mechanical mixing device can be used to mix the one or more other plastic materials and the one or more small particle starch or starch-based materials. In an implementation, at least a portion of the components of the mixture of the materials can be combined in an apparatus, such as an extruder, an injection molding machine, or the like. In other implementations, at least a portion of the components of the mixture of the materials can be combined before being fed into the apparatus.

The one or more starch or starch-based materials can be present in the mixture of materials in any desired fraction. By way of example, the starch or starch-based material may be included in an amount of at least 0.5%, at least 1%, at least 2%, at least 3%, at least 4%, at least 5%, at least 10%, at least 15%, at least 20%, at least 25%, at least 30%, at least 35%, at least 40%, at least 45%, no greater than 99%, no greater than 95%, no greater than 90%, no greater than 80%, no greater than 70%, no greater than 60%, no greater than 50%, from 2% to 98%, from 20% to 40%, from 10% to 40%, from 20% to 30%, from 20% to 35%, from 50% to 80%, or from 40% to 60% by weight of the mixture of materials. More than one starch or starch-based material, and/or more than one plastic material may be included in the blend, if desired. In an embodiment, at least some threshold amount of the starch or starch-based material having very small particle size characteristics is included, although it is possible that the article may include another starch or starch-based material that may include larger particle sizes (e.g., greater than 1.5 µm, or greater than 2 µm). Such additional material may be a different starch or starch-based material, or even possibly the same material, just having larger particle size characteristics. That said, in an embodiment, larger particle size starch or starch-based materials may be absent. Inclusion of such larger particles may not be desirable, particularly where the resulting properties may be no better than as described in Favis (which does include such particles that are 1.5-3 µm in size).

The plastic material with which the starch or starch-based material is blended can be present in the mixture of materials in an amount of at least 0.5%, at least 1%, at least 2%, at least 3%, at least 4%, at least 5%, at least 10%, at least 15%, at least 20%, at least 25%, at least 30%, at least 35%, at least 40%, at least 45%, at least 50%, no greater than 99%, no greater than 95%, no greater than 90%, no greater than 85%, no greater than 80%, no greater than 75%, no greater than 70%, no greater than 65%, or no greater than 60%, from 2% to 98%, from 50% to 90%, from 65% to 75%, from 20% to 50% or from 40% to 60% by weight of the mixture of materials. More than one such plastic material (i.e., combinations of such plastics) may be included in the blend.

A compatibilizer may optionally be present in the mixture of materials. The compatibilizer can be mixed with the plastic resin material, the starch or starch-based material, mixed with both, or provided separately. Often the compatibilizer may be provided with at least one of the polymeric materials, e.g., included in a masterbatch formulation. The compatibilizer can be a modified polyolefin or other modified plastic, such as a maleic anhydride grafted polypropylene, a maleic anhydride grafted polyethylene, a maleic anhydride grafted polybutene, or a combination thereof. The compatibilizer can also include an acrylate based co-polymer. For example, the compatibilizer can include an ethylene methyl acrylate co-polymer, an ethylene butyl-acrylate co-polymer, or an ethylene ethyl acrylate co-polymer. Additionally, the compatibilizer can include a poly(vinylacetate) based compatibilizer. In an embodiment, the compatibilizer may be a grafted version of the plastic material (e.g., maleic anhydride grafted polyethylene where the plastic material is polyethylene) or a copolymer (e.g., a block copolymer) where one of the blocks is of the same monomer as the plastic material (e.g., a styrene copolymer where the plastic material is polystyrene or ABS). Selection of a particular compatibilizer often depends on the identity of the plastic resin material included in the blend, and the compatibilizer (if even present) can be selected to provide good compatibility results between the starch or starch-based material and whatever particular plastic material is being used.

If present, the mixture of materials may include at least 0.5%, at least 1%, at least 2%, at least 3%, at least 4%, at least 5%, no greater than 50%, no greater than 45%, no greater than 40%, no greater than 35%, no greater than 30%, no greater than 25%, no greater than 20%, no greater than 15%, no greater than 10%, no greater than 9%, no greater than 8%, no greater than 7%, no greater than 6%, from 0.5% by weight to 12%, from 2% to 7%, or from 4% to 6% by weight of a compatibilizer. In some embodiments, no such compatibilizer will be needed, particularly given the ability of the starch or starch-based material to become dispersed at very small particle sizes, with substantially homogenous distribution, within the plastic material. In some embodiments, the compatibilizer selection may enhance such dispersion and small particle size.

Increases in the amount of compatibilizer may affect the particle size that can be achieved with the starch-based material. For example, increasing the amount of compatibilizer may allow for achieving smaller particle sizes (e.g., even less than 0.1 µm, such as from 0.01 µm to less than 0.2 µm, up to 0.15 µm, or up to 0.1 µm), and finer distribution of such particles. Such "nano" size particles may provide a significant or even extreme change in properties, as the particle size approaches the molecular size of the starch component. Selection or manipulation of molecular weight may be useful in achieving such "nano" size characteristics, where particle size may be less than 50, less than 40, less than 30, less than 20, or less than 10 times the size of a given molecule of the carbohydrate-based polymeric material (e.g., which may typically have a molecular size of up to about, e.g., 20 nm). In an embodiment, cellulose nano-fibers may be included.

The molecular weight of the small particle starch or starch-based material may be any desired value. By way of example, suitable carbohydrate-based polymeric materials may have molecular weight values greater than 100,000 g/mol, greater than 500,000 g/mol, greater than 750,000 g/mol, greater than 1 million g/mol, such as greater than 2 million, greater than 3 million, greater than 4 million, greater than 5 million, greater than 6 million, greater than 7 million, or greater than 8 million, e.g., up to 50 million, up to 40 million, up to 30 million, up to 25 million, or up to 20 million, such as from 10 to 16 million (e.g., see Applicant's Application No. 63/033,676 filed Jun. 2, 2020, herein incorporated by reference. Of course, lower molecular weight values may also be suitable for use (e.g., 1 million or less). Determination of molecular weight may be by any suitable technique, e.g., including but not limited to techniques based on absolute or relative GPC techniques. By way of example, the values obtained in Applicant's Application No. 63/033, 676 were obtained through absolute GPC size exclusion chromatography (SEC) techniques that will be apparent to those skilled in the art. Such tested NuPlastiQ materials exhibited polydispersity values (Mw/Mn) of from 1.4 to 2.0. For example, suitable materials may more generally exhibit polydispersity values of from 1 to 5, 1 to 3, or 1.25 to 2.5.

As the particle size decreases to the very small dimensions described herein, such materials may be suitable for use in applications where starch materials have previously been unsuitable, such as use in coating of paper cups, or the capsule materials used in sustained release fertilizers. Such paper cups are routinely incinerated in many countries (e.g., Japan), and the use of a starch or starch-based material of very small particle size would be an improvement over many currently employed fossil fuel resin materials used for such coatings. The use of such a material in fertilizer encapsulation (for sustained release of the fertilizer) would be advantageous, where such capsule materials often are eventually leaked to oceans and other bodies of water. The sustainable sourcing of the present materials, and potentially even their biodegradability in such an environment, for use in such fields, would be advantageous over fossil fuel resin materials (e.g., conventional polyolefins) currently used for such encapsulation. Further examples of possible fields of use where the very small particle size may be particularly beneficial include, but are not limited to adhesive resin materials, and sealants of laminate films, where incorporation of starch or starch-based materials into such materials may have proved problematic previously, because particle sizes were too great.

For example, finer particle sizes (e.g., less than 200 nm, less than 150 nm (0.15 µm), or less than 100 nm, (0.1 µm)) and/or the absence of relatively larger particles as described herein (e.g., avoidance of particles larger than 2 µm, larger than 1.5 µm, or larger than 1 µm) may result in increased transparency of a film formed from blends as described herein. In addition, such smaller particle sizes may better disturb the lamellar formation of the resin (e.g., plastic) included in the present blends, which disturbance may further enhance (speed and extent) biodegradability of the polyolefin or other plastic resin with which the blend is made. Further, increased particle surface area (through particle size reduction) may increase surface energy, providing greater tensile strength, dart impact, or other increased strength characteristics. Such increases may be more significant, and/or achieved over a wider starch loading range than the nominal increase seen only at very low starch loading as in Favis. For example, increases may be at least 20%, at least 25%, at least 30%, at least 35%, at least 40%, at least 45%, at least 50%, at least 55%, at least 60%, at least 65%, at least 70%, or at least 75%. Such increases may be observed at starch content loadings of at not only low loading values of less than 15%, but also at loading values of at least 15%, at least 20%, at least 25%, at least 30%, and even at least 35% starch or starch-bases material.

One possible mechanism for particle size reduction may include treatment of starch particles with ozone. "Ozonation of cassava starch to produce biodegradable films," International Journal of Biological Macromolecules 141 (2019) 713-720) is herein incorporated by reference in its entirety.

One or more additional "active" additives (e.g., UV and/or OXO additives) as known to be useful in the plastics' industry can be included in the mixture of materials in an amount of at least 0.5%, at least 1%, at least 1.5%, at least 2%, at least 2.5%, at least 3%, at least 4%, of no greater than 10%, no greater than 9%, no greater than 8%, no greater than 7%, no greater than 6%, no greater than 5%, from 0.2% to 12%, from 1% to 10%, from 0.5% to 4%, or from 2% by weight to 6% by weight of the mixture. Additional details of such UV and/or OXO additives is found in Applicants U.S. application Ser. No. 16/391,909, herein incorporated by reference in its entirety.

Filler additives (e.g., inorganics, such as calcium carbonate, talc or the like) can also be included in the mixture of materials. The starch or starch-based materials included in the present invention are not simply fillers, as they are believed to achieve strong intermolecular bonding with the base resin material of the blend. While such fillers may possibly be included in any amount (e.g., from 0% up to 90%), typically, any such filler may be present (if at all) within a range of up to 30%, or up to 20% by weight of the mixture of materials. Such fillers may reduce the amount of more expensive components needed in the composition. The particle size of such fillers on average may be smaller, similar, or larger than the average particle size of the starch or starch-based component in the blend.

While principally described in the context of a mixture of thermoplastic materials that can be melted together, to form a desired blend, in some embodiments, it may be possible to blend the starch or starch-based material with a plastic material that is not thermoplastic (e.g., that is thermoset, e.g., such as for silicone). For example, the resin components that are precursors of such non-thermoplastic plastic materials may be blended with the starch or starch-based material, where polymerization or other formation of the non-thermoplastic material may occur in the presence of the starch or starch-based material, resulting in a finished article that is a blend of the starch or starch-based material and a thermoset or other non-thermoplastic plastic material, where the starch or starch-based material exhibits small particle size and excellent dispersion characteristics as described herein. Blending of small particle starch or starch-based material with such thermoset materials may result in imparted biodegradability for non-biodegradable thermoplastics, and/or enhancement (extent and/or rate) for biodegradable thermoplastics, as described herein for other materials, (e.g., polyethylene).

By way of example, particularly where the materials are thermoplastic, a manufacturing process for forming an article may include heating the mixture of materials. In an implementation, the mixture of materials can be heated to a temperature of at least 100° C., at least 110° C., at least 115° C., at least 120° C., at least 125° C., at least 130° C., at least 135° C., at least 140° C., no greater than 250° C., no greater than 190° C., no greater than 180° C., no greater than 175° C., no greater than 170° C., no greater than 165° C., no greater than 160° C., no greater than 155° C., no greater than 150° C., from 95° C. to 250° C., from 120° C. to 180° C., or from 125° C. to 165° C. Heating of such materials may be within a multi-stage extruder, which heats the mixture of materials to a given temperature in each extruder stage, where progressive stages are heated to higher temperature than the preceding stage, e.g., as disclosed in various of Applicant's patent applications, already incorporated by reference. In an embodiment, the temperature of the first stage of such extruder for the blend may be in the same range as the temperature of the starch-based material (e.g., NuPlastiQ) in the final stage of the reactive extrusion process in which it was manufactured (e.g., 120-140° C.).

The mixture of materials including the ordinarily plastic material and the starch or starch-based material can be heated in one or more chambers of an extruder. In some cases, one or more chambers of the extruder can be heated at different temperatures. The speed of one or more screws of the extruder can be any desired rate.

An article is produced using the mixture of materials. In some cases, the article can include a film. In other cases, the article can be formed from a film. In other embodiments, the article can have a shape based on a design, such as a mold (e.g., injection molded). Any conceivable article formed of plastic may be formed from the mixture, e.g., including but not limited to films, bags, bottles, caps, lids, sheets, boxes, plates, cups, utensils, and the like. Where the article is a film, the film can be formed using a die by injecting a gas into the heated mixture of material to form the film (i.e., blowing the film). Films can be sealed and/or otherwise modified to be in the form of a bag or other article.

Where the article is a film, the film can be comprised of a single layer or multiple layers. The film or any individual layers can have a thickness of at least 0.001 mm, at least 0.002 mm, at least 0.004 mm, at least 0.01 mm, at least 0.02 mm, at least 0.03 mm, at least 0.05 mm, at least 0.07 mm, at least 0.10 mm, no greater than 2 mm, no greater than 1 mm, no greater than 0.5 mm, no greater than 0.1 mm, from about 0.05 mm to about 0.5 mm, or from 0.02 mm to 0.05 mm. While there may be some overlap in thickness values for film and sheet articles, it will be appreciated that sheet materials of greater thickness than such film values may of course be provided, produced by any desired plastic manufacturing process.

Films or other articles can have strength characteristics that are characterized through testing, such as a dart drop impact test (ASTM D-1709), tensile strength at break test (ASTM D-882), tensile elongation at break test (ASTM D-882), a secant modulus (ASTM D-882), and/or an Elmendorf Tear test (ASTM D-1922). Films can have a dart drop impact test value of at least 150 g, at least 175 g, at least 200 g, at least 225 g, at least 250 g, at least 275 g, at least 300 g, no greater than 400 g, no greater than 375 g, no greater than 350 g, or no greater than 325 g, from 140 g to 425 g, from 200 g to 400 g, from 250 g to 350 g, from 265 g to 330 g. In an implementation, such values may be for whatever the thickness of the film is. In another implementation, such values may be for a 1 mil thickness film formed from the mixture of materials.

The article can have a tensile strength at break test value in the machine direction of at least 3.5 kpsi, at least 3.7 kpsi, at least 3.9 kpsi, at least 4.1 kpsi, at least 4.3 kpsi, or at least 4.5 kpsi, no greater than 5.5 kpsi, no greater than 5.3 kpsi, no greater than 5.1 kpsi, no greater than 4.9 kpsi, or no greater than 4.7 kpsi, from 3.5 kpsi to 5.5 kpsi, or from 4.1 kpsi to 4.9 kpsi.

The article can have a tensile strength at break test value in the transverse direction of at least 3.2 kpsi, at least 3.4 kpsi, at least 3.6 kpsi, at least 3.8 kpsi, at least 4.0 kpsi, at least 4.2 kpsi, no greater than 5.7 kpsi, no greater than 5.5 kpsi, no greater than 5.3 kpsi, no greater than 5.1 kpsi, no greater than 4.9 kpsi, no greater than 4.7 kpsi, no greater than 4.5 kpsi, from 3.2 kpsi to 5.7 kpsi, or from 3.6 kpsi to 5.0 kpsi.

In an embodiment, the tensile strength (e.g., at break) in the machine direction may be similar to that in the transverse direction. In other words, the materials may exhibit strength that is substantially the same, independent of test direction. For example, in some films or other articles, high strength may be achieved in one direction, but in a trade-off for very low strength in the other direction. Such characteristics are not desirable in many applications (e.g., bags, agricultural films, etc.) where loads may be applied in either or both directions. The present articles may provide a ratio of strength (e.g., tensile strength) in one direction relative to another direction (e.g., MD/TD) that is from 0.75 to 1.25, from 0.8 to 1.2, or from 0.9 to 1.1. In other words, the strength value may be within 25%, within 20%, or within 10% of the value in the other direction. Such characteristics are particularly valuable in bags and other fields where loads may be applied in either or both directions. Such characteristics may also correlate to the relatively high dart drop impact values described herein, as dart drop typically accounts for strength in both directions, as well.

The article can have a tensile elongation at break test value in the machine direction of at least 550%, at least 560%, at least 570%, at least 580%, at least 590%, at least 600%, at least 610%, at least 620%, no greater than 725%, no greater than 710%, no greater than 700%, no greater than 680%, no greater than 665%, no greater than 650%, no greater than 635%, from 550% to 750%, or from 600% to 660%.

The article can have a tensile elongation at break test value in the transverse direction of at least 575%, at least 590%, at least 600%, at least 615%, at least 630%, or at least 645%, no greater than 770%, no greater than 755%, no greater than 740%, no greater than 725%, no greater than 710%, no greater than 695%, no greater than 680%, from 575% to 775%, or from 625% to 700%. The present articles may provide a ratio of elongation strength (e.g., tensile elongation at break) in one direction relative to another direction (e.g., MD/TD) that is from 0.75 to 1.25, from 0.8 to 1.2, or from 0.9 to 1.1. In other words, the tensile elongation value may be within 25%, within 20%, or within 10% of the value in the other direction.

Where applicable the article can have an Elmendorf tear force test value in the machine direction of at least 280 g/mil, at least 300 g/mil, at least 320 g/mil, at least 340 g/mil, or at least 360 g/mil, no greater than 450 g/mil, no greater than 430 g/mil, no greater than 410 g/mil, no greater than 390 g/mil, or no greater than 370 g/mil, from 275 g/mil to 475 g/mil, or from 325 g/mil to 410 g/mil.

Where applicable the article can have an Elmendorf tear force test value in the transverse direction of at least 475 g/mil, at least 490 g/mil, at least 500 g/mil, at least 525 g/mil, at least 540 g/mil, or at least 550 g/mil, no greater than 700 g/mil, no greater than 680 g/mil, no greater than 650 g/mil, no greater than 625 g/mil, no greater than 600 g/mil, no greater than 580 g/mil, or no greater than 570 g/mil, from 475 g/mil to 725 g/mil, or from 490 g/mil to 640 g/mil.

Where applicable the article can have a secant modulus of elasticity test value in the machine direction of at least 20 kpsi, at least 22 kpsi, at least 24 kpsi, at least 26 kpsi, at least 28 kpsi, or at least 30 kpsi, no greater than 40 kpsi, no greater than 38 kpsi, no greater than 36 kpsi, no greater than 34 kpsi, or no greater than 32 kpsi, from 20 kpsi to 40 kpsi, or from 25 kpsi to 35 kpsi.

Where applicable the article can have a secant modulus of elasticity test value in the transverse direction of at least 20 kpsi, at least 22 kpsi, at least 24 kpsi, at least 26 kpsi, at least 28 kpsi, or at least 30 kpsi, no greater than 40 kpsi, no greater than 38 kpsi, no greater than 36 kpsi, no greater than 34 kpsi, or no greater than 32 kpsi, from 20 kpsi to 40 kpsi, or from 25 kpsi to 35 kpsi.

In some cases, articles including a starch or starch-based material including or formed from a mixture of two or more starches have values of strength properties that are greater than articles including a starch or starch-based material including or formed from a single starch. For example, an article including a starch or starch-based material including or formed from a mixture of two or more starches can have a dart drop impact test value (in grams or g/mil of thickness) that is at least about 10% greater than an article where the starch or starch-based material includes or is formed from a single starch, at least about 25% greater, at least about 50% greater, at least about 75% greater, from 10% greater to 150% greater or from 60% greater to 120% greater than the same article but including a starch or starch-based material including or formed from a single starch. Details of such increased strength is found within U.S. Pat. No. 10,214,634 and U.S. application Ser. No. 15/481,806, each incorporated by reference in its entirety herein.

When subjected to biodegradation testing (e.g., whether biomethane potential testing (generally based on ASTM or other standards, but under accelerated conditions), or any applicable ASTM standard, such as ASTM D-5511, ASTM D-5526, ASTM D-5338, or ASTM D-6691, the articles of this invention, including small particle starch or starch-based materials may exhibit significant biodegradation. Under such testing, and within a given time period (e.g., 30 days, 60 days, 90 days, 180 days, 365 days (1 year), 2 years, 3 years, 4 years, or 5 years, the articles may show substantial biodegradation of the total polymeric content, and/or the other plastic content (apart from the starch or starch-based content). Biomethane potential testing (BMP) is typically conducted over 30 or 60 days, although sometimes for as long as 90 days. The longer time period tests are more typically performed under any of the above mentioned ASTM standards. Those or ordinary skill in the art will be familiar with various BMP test conditions, and longer term ASTM and other test conditions. Articles made from the compositions of this invention may show biodegradation that is greater than the starch or starch-based material content thereof, indicating that the plastic material(s) are also biodegrading (or exhibit the potential to biodegrade under a biomethane potential test). Such results are novel, in that all prior art blends including non-biodegradable plastic material and starch or starch based materials known to applicant exhibit biodegradation values that are always no more than (typically less than) the starch or starch-based material content of the blended material. For example, a material such as Favis or any other conventional blend will exhibit biodegradation of less than 12.5%, where the starch or starch-based content is included at 12.5%. Where the present blends include, for example, 25% starch or starch-based material, they exhibit biodegradation of greater than 25% biodegradation, indicating biodegradation of at least some of the included plastic material in the blend. Such results have been confirmed by various third party testing, and corroborated by forensic analysis of the soil inoculum (searching for any plastic fragments or microfragments in the soil inoculum after the respirometry-based test), as well as post-biodegradation $C^{14}/C^{12}$ analysis.

Particularly when subjecting the articles to testing simulating biodegradation under landfill or other degradation conditions (e.g., composting conditions, or marine conditions) for 180 days, 200 days, 365 days (1 year), 2 years, 3 years, or 5 years, the biodegradation can be greater than the weight percent of starch or starch-based materials within the article. In other words, inclusion of the described small particle starch or starch-based materials can result in at least some biodegradation of the other plastic material (which materials alone may not significantly biodegrade).

For example, an article such as a film that is formed from a blend of the starch or starch-based materials, and PE may exhibit biodegradation after such periods of time that is at least 5%, at least 10%, at least 15%, or at least 20% more than the weight fraction of the starch or starch-based materials in the film, indicating that significant fractions of the PE (normally not biodegradable) is actually being biodegraded, with the starch or starch-based material. Stated another way, at least 5%, at least 10%, at least 15%, or at least 20% of the PE or other non-biodegradable matrix material may be biodegrading. Such results are surprising, and particularly advantageous. Such results are described in detail in various of the applications already incorporated by reference. Such characteristics are not inherent in any prior art conventional blends known to Applicant.

Biomethane potential testing determines the potential for anaerobic biodegradation based methanogenesis as a percent of total methanogenesis potential. Biomethane potential testing can be used to predict biodegradability of the tested samples according to a given ASTM standard (e.g., ASTM D-5511 or ASTM D-5338) and the biomethane potential testing can be conducted using one or more conditions from such ASTM standard. For example, the biomethane potential testing can take place at a temperature of about 52° C. Additionally, the biomethane potential testing can have some conditions that are different from those of the ASTM standard, e.g., to accelerate the test so as to be completed within the typical 30, 60, or sometimes as long as 90 days. Biomethane potential testing can employ an inoculum having from 50% to 60% by weight water and from 40% to 50% by weight organic solids. For example, an inoculum used in biomethane potential testing can have 55% by weight water and 45% by weight organic solids. Biomethane potential testing can also take place at other temperatures, such as from 35° C. to 55° C. or from 40° C. to 50° C.

When subjected to biodegradation testing, an article made from the compositions of this invention having an amount of starch or starch-based material and the other plastic material as described herein can exhibit excellent biodegradation. For example, at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, or even at least 95% of the non-starch-based material (e.g., the "other" plastic material) may biodegrade over a period of at least about 1 year, at least about 2 years, at least about 3 years, or at least about 5 years when subjected to anaerobic digester, aerobic digester, composting (e.g., industrial compost), and/or marine conditions (or conditions simulating such) provided by any of the relevant ASTM standards (e.g., ASTM D-5338, ASTM D-5511, ASTM D-5526, ASTM D-6691). Such biodegradation is particularly remarkable and advantageous. Thus not only does the starch or starch-based material biodegrade, but the other plastic material may as well. This has been observed to occur in the present blends, even where the distribution of the starch-based material is discontinuous. As described in Favis (and perhaps other references), biodegradation of discontinuous starch domains does not occur in those prior art blends, which are clearly different from those described herein, as their properties differ significantly.

With increased time, the amount of biodegradation can be very high, such that in at least some implementations, substantially the entire article biodegrades (e.g., biodegradation of at least about 85%, at least about 90%, or at least about 95% within 180 days, or 200 days, or 365 days (1 year), within 2 years, within 3 years, within 5 years, or other period). Biodegradation may be considered to be complete where the amount of biodegradation in the article is at least as great as that achieved in a cellulose positive control, tested under the same conditions, for the same time period.

The starch or starch-based blend may be significantly more hydrophobic than many other prior art blends, to better match a typical polyolefin material. For example, typical polyethylene and polypropylene materials often have a surface wettability rating of about 29-32 dyne/cm, which is hydrophobic. NuPlastiQ, which is an example of a small particle starch-based material is similarly hydrophobic, e.g., having a wettability value when used in such a dyne test of less than 40 dyne/cm, less than 38 dyne/cm, less than 36 dyne/cm, or less than 34 dyne/cm. Such surface wettability dyne tests may be according to DIN 53394/ISO 8296, for example. The matched hydrophobicity between any starch or starch-based material and the polymeric material with which it is blended may also play a part in the ability to achieve the very good distribution and very small particle size described herein.

Figure 1D:
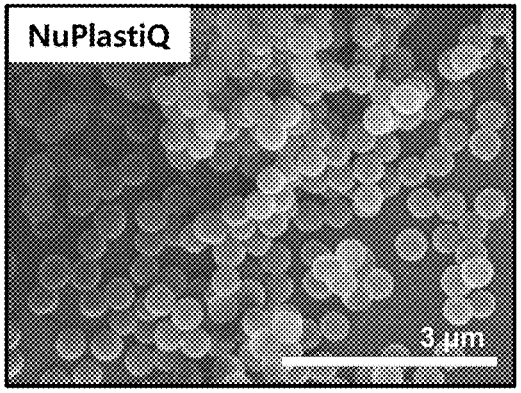
FIG. 1D is an SEM image showing Applicant's NuPlastiQ GP starch-based particles, which are substantially uniformly spherical, and significantly smaller than the particles of FIGS. 1A-1C. These small particles are formed from a blend of corn starch and potato starch, as well as glycerin and water, formed in a reactive extrusion process.
Figure 1B:
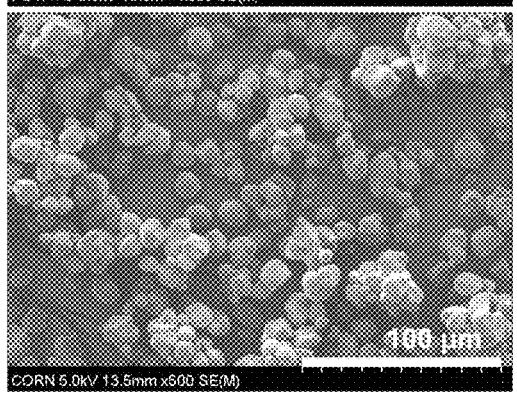
Figure 1C:
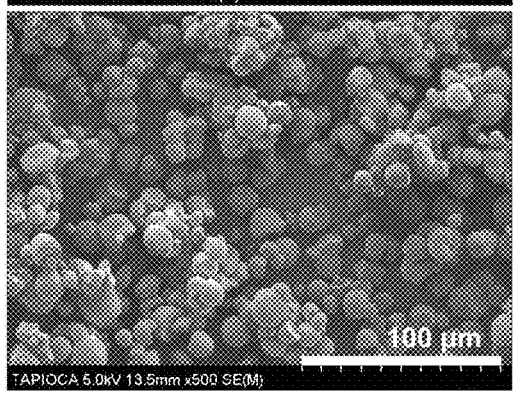

FIGS. 1A-1D show exemplary potato, corn, tapioca, and NuPlastiQ GP particles, contrasting the significant difference in size, as well as uniformity in size and shape of the exemplary NuPlastiQ starch-based particles, as compared to the native starches. FIG. 1A shows potato starch particles, having sizes from 5 to 50 μm, where the particles vary widely in size, and shape ranges from generally spherical to oval shaped. FIG. 1B shows corn starch particles, having sizes from 5 to 20 μm, where the particles also vary relatively widely in size, and shape is quite angular along the edges, so that the particles are generally polygonal, rather than substantially spherical. FIG. 1C shows tapioca starch particles, which share many similarities to the corn starch particles, where sizes also range from 5 to 20 μm, and the shape is also polygonal, with angular edges. For example, avoiding potato starch may aid in reducing particle sizes. Reducing the crystallinity of the starch material may also aid in reducing particle size.

FIG. 1D shows NuPlastiQ GP particles, which appear significantly different from the particles of FIGS. 1A-1C, particularly given the difference in scale (by a factor of over 30) between the two. The NuPlastiQ starch-based particles are significantly smaller in size, and are substantially uniform in shape. In particular, the NuPlastiQ starch-based particles not only exhibit an average size (e.g., diameter) of about 0.3 μm (300 nm), and are uniformly substantially spherical in shape, although they may be ever so slightly oblong, having an aspect ratio (length to width for the shape that is substantially spherical) of 0.7 to 1.3, or 0.8 to 1.2 (e.g., within 30%, or 20% of perfectly spherical), but one will also notice the absence of significantly larger particle sizes in the shown particles (e.g., no particles greater than 1 μm, greater than 1.5 μm, or greater than 2 μm). The particle size distributions in Favis note the presence of such larger particle sizes.

From FIG. 1D it is apparent that the particles of NuPlastiQ GP starch-based material show very little variation in size from one particle to the next, so as to exhibit a very tight distribution of sizes about the mean particle size. FIG. 2 charts an exemplary particle size distribution for a similar NuPlastiQ GP material, with a slightly larger average particle size (0.5 μm compared to 0.3 μm) as compared to FIG. 1D, but otherwise similar thereto. FIG. 2 shows a tight bell curve type particle size distribution around 0.4 to 0.5 μm, with about 90% or more of the particles falling between 0.3 and 0.8 μm. The standard deviation of the distribution seen in FIG. 2 is 0.14 (i.e., mean particle diameter is 0.5±0.14 μm). The mean aspect ratio is 1.2±0.15. There are no particles larger than 2 μm, larger than 1.5 μm, etc.

Thus, in an embodiment, the mean particle size is less than 2 μm, less than 1 μm, less than 0.5 μm, less than 0.2 μm, such as from 0.01 μm to 1 μm, from 0.05 μm to 1 μm, from 0.1 μm to 1 μm, from 0.1 μm to 0.8 μm, from 0.15 μm to 0.8 μm (e.g., 0.1 μm, 0.15 μm, 0.2 μm, 0.3 μm, 0.4 μm, 0.5 μm, 0.6 μm or the like). Particles larger than 1 μm, 1.5 μm, or 2 μm may be completely absent, in an embodiment. Such small particle sizes, and relatively uniform shape (substantially spherical), may provide for average particle volumes of less than 10 μm$^3$, less than 8 μm$^3$, less than 7 μm$^3$, less than 6 μm$^3$, less than 5 μm$^3$, less than 4 μm$^3$, less than 3 μm$^3$, less than 2 μm$^3$, less than 1 μm$^3$, less than 0.5 μm$^3$, less than 0.3 μm$^3$, less than 0.2 μm$^3$, less than 0.1 μm$^3$, less than 0.05 μm$^3$, less than 0.03 μm$^3$, such as from 0.000001 μm$^3$ to 1 μm$^3$, from 0.00001 μm$^3$ to 1 μm$^3$, from 0.0001 μm$^3$ to 1 μm$^3$, from 0.001 μm$^3$ to 1 μm$^3$, from 0.01 μm$^3$ to 1 μm$^3$, from 0.01 μm$^3$ to 0.1 μm$^3$, or the like. By way of example, the 0.5 μm diameter particles of FIG. 2 have a per particle volume of $4/3 \cdot \pi \cdot r^3$, where r is 0.25 μm$^3$ (V=0.065 μm$^3$), and the 0.3 μm particles of FIG. 1D have a per particle volume of V=0.014 μm$^3$. A particle having a diameter of 0.1 μm has a per particle volume of V=0.209 μm$^3$, while a particle having a diameter of 0.05 μm has a per particle volume of V=0.0000654 μm$^3$. It will be readily apparent that volume decreases very quickly (as a cubic function) with decreasing diameter). Thus, even small decreases in diameter have a very significant effect on volume.

Because of the extremely small particle sizes, the particle density of such particles (e.g., number of particles per given volume of the article) is significantly higher than for many if not all conventional blends. For example, the particle density may be at least $1\times10^8$ particles/mm$^3$, at least $1\times10^9$ particles/mm$^3$, at least $1.5\times10^9$ particles/mm$^3$, or at least $2\times10^9$ particles/mm$^3$, such as from $1.5\times10^9$ particles/mm$^3$ to $100\times10^9$ particles/mm$^3$, (e.g., while exhibiting increased strength). Particle density of course depends on average particle size, absence of relatively larger particles, and loading of the starch-based material in the blend. By way of exemplary calculation, for a particle size of 0.5 μm, the per particle volume is 0.065 μm$^3$, and the mass of such a particle is $0.09156\times10^{-12}$ g. For a blend that includes 20% by weight of the starch or starch-based material, (e.g., and 80% of the other polymeric material), this may equate to about 0.2 g of the starch or starch-based material per cm$^3$ of the blend as a whole (e.g., where density of the starch or starch-based material is about 1.4 g/cm$^3$ (at least in the case of NuPlastiQ) and density of the other polymeric material is about 0.9 g/cm$^3$). This equates to about $2.184\times10^{12}$ particles per cm$^3$ ($2.184\times10^9$ particles per mm$^3$, or about 35,000 particles per mil$^3$) of the blend. For an otherwise similar 20/80 blend, but where the particles are only 0.3 μm in size (volume of 0.014 μm$^3$ per particle), this equates to about $10.11\times10^{12}$ particles per cm$^3$ ($10.11\times10^9$ particles per mm$^3$, or about 165,000 particles per mil$^3$) of the blend. Additional calculations could be performed for even smaller particle sizes (e.g., 0.15 μm, 0.1 μm or 0.05 μm). If the loading of the starch or starch-based material were only one-tenth that of the above examples (e.g., 2%), the particle densities would be 1/10 those listed above. If the starch or starch-based material loading where double that of such examples (e.g., 40%), the particle densities would be double those listed above. It will be appreciated that a wide range of particle density loadings are thus possible, although in any case, the particles will be extremely small in size, substantially homogenously distributed throughout the blend (e.g., a particle density of at least $1\times10^8$ particles/mm$^3$ (about 1500 particles/mil$^3$).

Stated in another way, the blend may include a particle density of at least $0.5\times10^8$ particles/mm$^3$ per percentage point of the starch or starch-based material included in the blend. Thus, at a 10% loading, the particle density may be at least $0.5\times10^9$ particles/mm$^3$, at a 20% loading the particle density may be at least $1\times10^9$ particles/mm$^3$, etc. As shown by the calculations above, actual particle density values for such loadings may be higher (e.g., about $2\times10^9$ particles/mm$^3$ at 20% loading, about $1\times10^9$ particles/mm$^3$ at 10% loading, and about $1\times10^8$ particles/mm$^3$ at 1% loading), depending on actual average particle size and distribution.

In the case of films, the film may have a thickness that is from 5 to 300 times, or from 10 to 100 times an average particle size of the particles of the starch or starch-based material. For example, because the particle sizes are extremely small, this may facilitate formation of very thin films (e.g., routinely less than 1 mil, such as 0.5 mil, 0.3 mil, or 0.1 mil). Larger particle sizes would interfere with the ability to form such thin films without formation of voids or other faults because of the large starch particles, or would negatively affect the strength characteristics of such films, as a result of the inclusion of large starch "inclusions" in the film material. Such problems may occur even with a small average particle size, where the distribution is too "inclusive" including relatively larger particles, such as those sized equal to or greater than 1 μm, equal to or greater than 1.5 μm or equal to or greater than 2 μm, e.g., as in Favis. Another way to characterize such tight particle size distributions is by the standard deviation, as described herein.

Figure 3A:
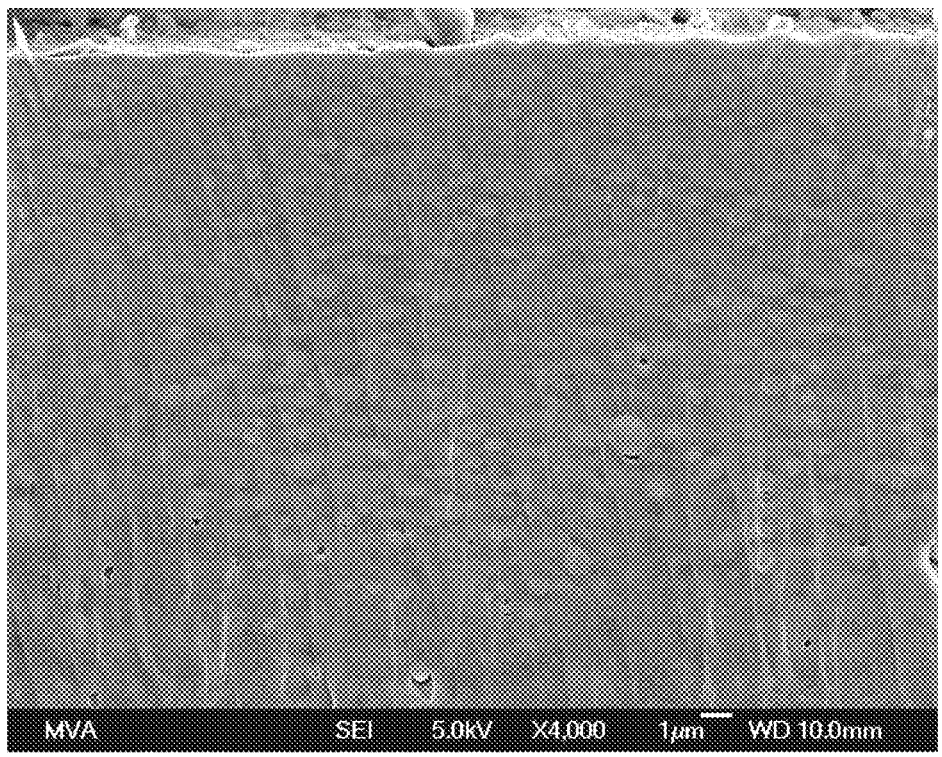
FIG. 3A is an SEM image through a cross-section of an exemplary film made of a blend of NuPlastiQ and another polymeric material, showing substantially homogenous distribution of very fine NuPlastiQ particles.
Figure 3B:
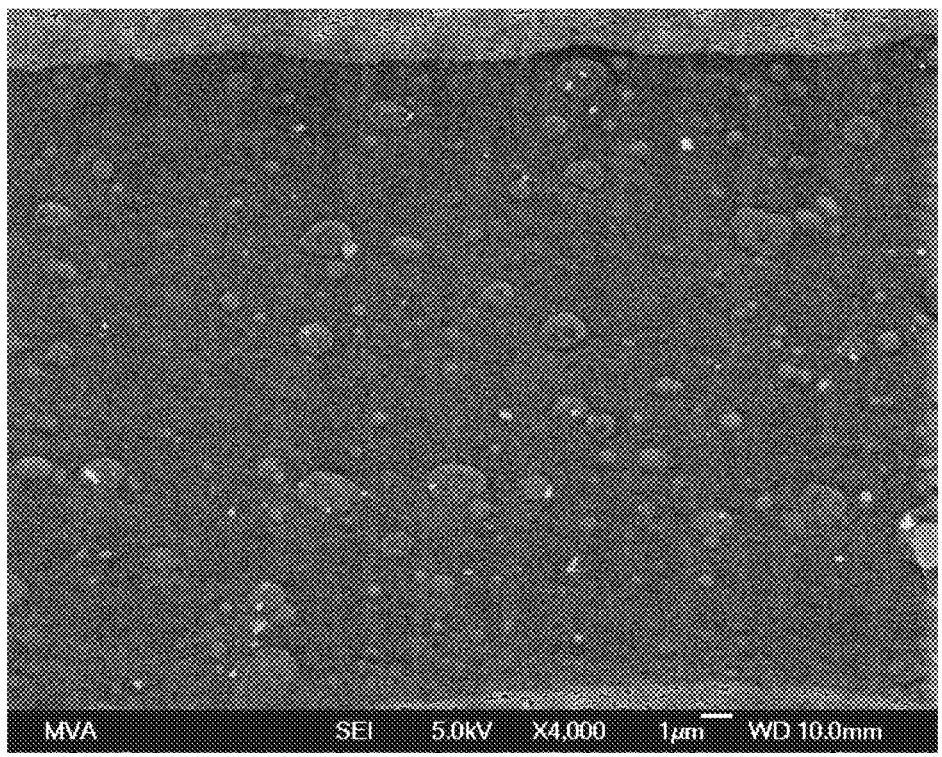
FIG. 3B is an SEM image through a cross-section of a film formed from a conventional blend of a starch-based material and another polymeric material, showing significantly larger particles and a wider distribution of particle sizes, as compared to FIG. 3A.

FIG. 3A shows an SEM image of an exemplary film formed from a blend of about 20% NuPlastiQ GP starch-based material and about 80% polyethylene, with very small NuPlastiQ average particle size (e.g., less than 1 μm, such as 0.3 to 0.8 μm). 93% of the particles seen in FIG. 3A are smaller than 1 μm. The particles exhibit substantial uniformity in both size and shape. FIG. 3B shows an SEM image of a comparative film formed from a blend of a conventional blend (also about 20% TPS and about 80% polyethylene). The particles are far less uniform in shape and size. Average particle size is significantly greater than that of FIG. 3A (e.g., 64% of particles are larger than 1 μm). By way of further explanation, an average particle size of 0.5 μm provides particles that are over 200 times smaller in volume than an average particle size of 3 μm. Such equates to an enormous difference in the density of particles (e.g., number of particles per mm$^3$) as well as the surface area associated with such particles.

Features from any of the disclosed embodiments or claims may be used in combination with one another, without limitation. It will be appreciated that the scope of the present disclosure extends to rewriting any of the claims to depend from any other claim, to include multiple dependencies from any combination of other claims, and/or to combine multiple claims together. Such also extends to any individual or combinations of features of any of the embodiments as described in the Summary section, as well as the Detailed Description section. The scope of the present disclosure extends to inserting and/or removing any feature or combination of features from any claim or described embodiment, for insertion into another claim or embodiment, or drafting of a new claim including any combination of such features from any other claim(s) or embodiments.

It will also be appreciated that the present claimed invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

The invention claimed is:

1. A method of blending small particle starch with a polymeric resin material, the method comprising:
    providing a small particle starch or starch-based material having an average particle size of less than 1.5 μm per particle, where such small particle starch or starch-based material is substantially free of particles sized 2 μm or greater, wherein the small particle starch or starch-based material has a crystallinity of less than about 20%, and resists recrystallization, and has a water content no greater than 2% by weight;
    providing a polymeric material comprising at least one of polyethylene, polypropylene, polystyrene, poly(butylene adipate-co-terephthalate) or polylactic acid;
    blending the starch or starch-based material into the polymeric material so that the starch or starch-based material is intimately dispersed within the polymeric material.

2. The method of claim 1, wherein the small particle starch comprises starch powder, blended as a powder with the polymeric material.

3. The method of claim 1, wherein the average particle size is less than 1 μm.

4. The method of claim 1, wherein the average particle size is from 10 nm to 1 μm.

5. The method of claim 4, wherein the small particle starch or starch-based material is present as generally uniformly sized regularly shaped substantially spherical particles, with a diameter from 10 nm to 1 μm.

6. The method of claim 1, wherein the average particle size is less than 150 nm.

7. The method of claim 1, wherein the small particle starch or starch-based material is present in an amount of at least 1% by weight of the blend.

8. The method of claim 1, wherein the small particle starch or starch-based material is present in an amount of at least 10% by weight of the blend.

9. The method of claim 1, wherein the blend further comprises at least one additional starch or starch-based material, having a larger average particle size than the small particle starch or starch-based material that has an average particle size of less than 1.5 μm per particle.

10. The method of claim 9, wherein the at least one additional starch or starch-based material having a larger average particle size than the small particle starch or starch-based material is present in an amount of at least 1% by weight of the blend.

11. The method of claim 9, wherein the at least one additional starch or starch-based material having a larger average particle size than the small particle starch or starch-based material is present in an amount of at least 10% by weight of the blend.

12. The method of claim 1, wherein the small particle starch is achieved by reducing the particle size of a starch having an initial particle size, by treating such starch with ozone.

13. The method of claim 12, wherein the starch having an initial particle size has an initial average particle size of at least 5 μm.

14. The method of claim 12, wherein the starch having an initial particle size is characterized by polygonal shaped starch particles, with angular edges.

15. The method of claim 12, wherein the small particle starch is characterized by generally uniformly sized regularly shaped substantially spherical particles.

16. The method of claim 1, wherein the small particle starch is present within the blend in an amount of from 1% up to 30% by weight, wherein strength of the blend is greater than strength of the pure polymeric material alone.

17. The method of claim 16, wherein the strength of the blend is at least 25% greater than strength of the pure polymeric material alone.

18. The method of claim 16, wherein the strength of the blend is at least 30% greater than strength of the pure polymeric material alone.

19. The method of claim 16, wherein the strength of the blend is at least 35% greater than strength of the pure polymeric material alone.

20. The method of claim 1, wherein the blend further comprises a compatibilizer.

21. The method of claim 1, wherein the blend exhibits enhanced biodegradation in the form of enhanced rate or extent of biodegradability of the polymeric material included in the blend.

22. The method of claim 1, wherein both the polymeric material and the small particle starch or starch-based material are hydrophobic, so that an article formed from a blend of the polymeric material and the small particle starch or starch-based material has a hydrophobicity of less than 40 dyne/cm.

23. The method of claim 1, wherein the particles of the small particle starch or starch-based material are substantially spherical, having a mean aspect ratio from 0.7 to 1.3.

24. The method of claim 1, wherein the particles of the small particle starch or starch-based material are substantially spherical, having a mean aspect ratio of about 1.2±0.15.

25. The method of claim 1, wherein the small particle starch or starch-based material and the polymeric material exhibit a lack of sea-island features when blended together to form an article.

26. The method of claim 1, wherein the small particle starch or starch-based material is substantially free of small particle starch or starch-based material particles having a particle size of greater than 1.5 μm.

27. The method of claim 1, wherein an average particle density of the particles of the small particle starch or starch-based material within the blend is from $1 \times 10^8$ to $100 \times 10^9$ particles/mm$^3$.

28. The method of claim 1, wherein an average particle volume of the particles of the small particle starch or starch-based material within the blend is from 0.000001 μm$^3$ to 1 μm$^3$.

29. The method of claim 1, wherein the polymeric material comprises poly(butylene adipate-co-terephthalate).

30. The method of claim 1, wherein the polymeric material comprises polylactic acid.

31. The method of claim 1, wherein the polymeric material comprises polyethylene.

32. The method of claim 1, wherein the polymeric material comprises polypropylene.

33. The method of claim 1, wherein the polymeric material comprises polystyrene.

34. The method of claim 1, wherein the small particle starch or starch-based material is present as generally uniformly sized regularly shaped substantially spherical particles.

35. A method of blending small particle starch with a polymeric resin material, the method comprising:
providing a small particle starch or starch-based material having an average particle size of less than 1.5 μm per particle, where such small particle starch or starch-based material is substantially free of particles sized 2 μm or greater, wherein the small particle starch or starch-based material has a crystallinity of less than about 20%, and resists recrystallization, and has a water content no greater than 2% by weight;
providing a polymeric material comprising at least one of poly(butylene adipate-co-terephthalate) or polylactic acid;
blending the starch or starch-based material into the polymeric material so that the starch or starch-based material is intimately dispersed within the polymeric material.

* * * * *